United States Patent
Takemori et al.

(10) Patent No.: US 11,330,432 B2
(45) Date of Patent: May 10, 2022

(54) MAINTENANCE SYSTEM AND MAINTENANCE METHOD

(71) Applicant: KDDI CORPORATION, Tokyo (JP)

(72) Inventors: Keisuke Takemori, Tokyo (JP); Seiichirou Mizoguchi, Tokyo (JP); Akinori Totsuka, Tokyo (JP); Hiroshi Ishizuka, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 208 days.

(21) Appl. No.: 16/624,077

(22) PCT Filed: Jun. 22, 2018

(86) PCT No.: PCT/JP2018/023897
§ 371 (c)(1),
(2) Date: Dec. 18, 2019

(87) PCT Pub. No.: WO2019/004097
PCT Pub. Date: Jan. 3, 2019

(65) Prior Publication Data
US 2020/0389791 A1    Dec. 10, 2020

(30) Foreign Application Priority Data

Jun. 27, 2017 (JP) .............................. JP2017-125369

(51) Int. Cl.
*H04W 12/06* (2021.01)
*H04L 9/08* (2006.01)
(Continued)

(52) U.S. Cl.
CPC ............ *H04W 12/06* (2013.01); *H04L 9/08* (2013.01); *H04L 9/3273* (2013.01); *H04L 63/08* (2013.01); *H04W 12/041* (2021.01)

(58) Field of Classification Search
CPC ...... H04W 12/06; H04W 12/041; H04L 9/08; H04L 9/3273; H04L 63/08; H04L 9/32;
(Continued)

(56) References Cited

U.S. PATENT DOCUMENTS 7,314,169 B1 * 1/2008 Jasper ................... G06F 21/445
235/382
8,443,426 B2 * 5/2013 Mattsson .............. G06F 16/217
726/6
(Continued)

FOREIGN PATENT DOCUMENTS

| CN | 1886928 | 12/2006 |
|---|---|---|
| CN | 104205792 | 12/2014 |

(Continued)

OTHER PUBLICATIONS

Keisuke Takemori et al., "In-Vehicle Network Security Using Secure Element", IEICE Transactions on Fundamentals of Electronics, Communications and Computer Sciences., vol. E99.A, No. 1, Jan. 2016, pp. 208-216, XP055537638, JP, ISSN: 0916-8508, DOI: 10.1587/transfun.E99 A.208.

(Continued)

*Primary Examiner* — Aravind K Moorthy
(74) *Attorney, Agent, or Firm* — Greenblum & Bernstein, P.L.C.

(57) ABSTRACT

A maintenance system includes a server device, a terminal device, and an in-vehicle device installed in a vehicle. The server device includes a worker authentication information reception unit configured to receive worker authentication information from the terminal device, a server authentication processing unit configured to perform an authentication process on the worker authentication information, and a server key transmission unit configured to transmit a first key to be used with the in-vehicle device to the terminal device whose worker authentication information has been (Continued)

successfully authenticated by the server authentication processing unit. The terminal device includes a worker authentication information transmission unit configured to transmit the worker authentication information to the server device, a terminal key reception unit configured to receive the first key from the server device, and a terminal authentication processing unit configured to perform an authentication process with the in-vehicle device using the first key.

9 Claims, 8 Drawing Sheets

(51) Int. Cl.
  *H04L 9/32* (2006.01)
  *H04L 9/40* (2022.01)
  *H04W 12/041* (2021.01)
  *H04L 29/06* (2006.01)

(58) Field of Classification Search
  CPC ..... H04L 63/0428; H04L 63/10; H04L 67/12; G07C 2205/02; G07C 5/0808; G06F 21/31; G06F 21/85
  See application file for complete search history.

(56) References Cited

U.S. PATENT DOCUMENTS

| | | | | |
|---|---|---|---|---|
| 8,984,282 | B1* | 3/2015 | Kragh | H04L 9/321 713/186 |
| 9,204,302 | B1* | 12/2015 | Shaw | H04M 3/533 |
| 9,674,194 | B1* | 6/2017 | McClintock | G06F 21/604 |
| 9,760,697 | B1* | 9/2017 | Walker | G06F 21/602 |
| 10,296,355 | B2* | 5/2019 | Keyser | H04L 9/3249 |
| 10,855,664 | B1* | 12/2020 | Ziraknejad | H04W 4/021 |
| 2003/0005326 | A1* | 1/2003 | Flemming | G07C 9/37 726/4 |
| 2004/0006631 | A1* | 1/2004 | Nonaka | G06F 21/35 709/229 |
| 2005/0154923 | A1* | 7/2005 | Lok | H04L 63/0807 726/19 |
| 2005/0254514 | A1* | 11/2005 | Lynn | H04L 63/0846 370/450 |
| 2006/0085652 | A1* | 4/2006 | Zimmer | G06F 13/4068 713/193 |
| 2007/0143835 | A1* | 6/2007 | Cameron | G06F 21/33 726/9 |
| 2007/0245369 | A1* | 10/2007 | Thompson | H04L 63/10 725/30 |
| 2008/0075290 | A1 | 3/2008 | Nishiguchi et al. | |
| 2008/0281485 | A1* | 11/2008 | Plante | G07C 5/0858 701/33.4 |
| 2010/0296387 | A1* | 11/2010 | Jain | G06F 21/606 701/1 |
| 2011/0083161 | A1 | 4/2011 | Ishida et al. | |
| 2011/0276803 | A1* | 11/2011 | Bender | H04L 9/3263 713/175 |
| 2012/0265988 | A1* | 10/2012 | Ehrensvard | H04L 63/0435 713/165 |
| 2013/0066786 | A1* | 3/2013 | Joyce | G06Q 20/3823 705/71 |
| 2013/0145447 | A1* | 6/2013 | Maron | G06F 21/31 726/6 |
| 2013/0160086 | A1* | 6/2013 | Katar | H04L 63/08 726/4 |
| 2013/0208893 | A1* | 8/2013 | Shablygin | H04L 9/3234 380/277 |
| 2015/0052591 | A1* | 2/2015 | Miura | A01B 79/005 726/4 |
| 2015/0058950 | A1* | 2/2015 | Miu | G06Q 20/384 726/7 |
| 2015/0195364 | A1* | 7/2015 | Petersen | H04W 12/04 713/168 |
| 2015/0244712 | A1* | 8/2015 | Iwanski | H04L 63/0823 713/153 |
| 2016/0034305 | A1* | 2/2016 | Shear | G06F 9/50 707/722 |
| 2016/0148450 | A1 | 5/2016 | Ohshima | |
| 2016/0321290 | A1* | 11/2016 | Luthra | G06F 16/113 |
| 2016/0364197 | A1* | 12/2016 | Cho | G06Q 20/102 |
| 2016/0371481 | A1 | 12/2016 | Miyake | |
| 2017/0006009 | A1* | 1/2017 | Hessler | G06Q 20/32 |
| 2017/0006060 | A1* | 1/2017 | Venkataramani | H04L 63/1466 |
| 2017/0104588 | A1* | 4/2017 | Camenisch | H04L 9/0869 |
| 2017/0124562 | A1* | 5/2017 | Hessler | G06Q 20/321 |
| 2017/0195320 | A1* | 7/2017 | Yoo | H04L 9/0861 |
| 2017/0201385 | A1* | 7/2017 | Kravitz | H04L 9/006 |
| 2017/0279620 | A1* | 9/2017 | Kravitz | H04L 63/0876 |
| 2017/0318011 | A1* | 11/2017 | Yoo | H04L 63/0428 |
| 2017/0330402 | A1 | 11/2017 | Menard et al. | |
| 2017/0372533 | A1* | 12/2017 | Merg | G07C 5/12 |
| 2018/0006819 | A1* | 1/2018 | Watanabe | G06F 21/31 |
| 2018/0013738 | A1* | 1/2018 | Yoo | H04L 63/0853 |
| 2018/0076958 | A1* | 3/2018 | Nari | H04L 9/0877 |
| 2018/0167789 | A1* | 6/2018 | Tsuchida | G06F 13/00 |
| 2018/0227120 | A1* | 8/2018 | Takemori | H04L 9/0894 |
| 2018/0292513 | A1* | 10/2018 | Bidner | G01S 17/58 |
| 2018/0308295 | A1* | 10/2018 | Kwak | G07C 5/008 |
| 2018/0322721 | A1* | 11/2018 | Hu | B60R 25/24 |
| 2018/0343562 | A1* | 11/2018 | Nalukurthy | H04L 9/3215 |
| 2019/0028267 | A1* | 1/2019 | Takemori | H04L 9/0866 |
| 2019/0039567 | A1* | 2/2019 | Froitzheim | G07C 9/00309 |
| 2019/0107401 | A1* | 4/2019 | Schmidt | G06Q 10/06316 |
| 2019/0110195 | A1* | 4/2019 | Ito | H04W 12/0431 |
| 2019/0155998 | A1* | 5/2019 | Yamaguchi | G06Q 50/10 |
| 2019/0238325 | A1* | 8/2019 | Takemori | H04L 9/3271 |
| 2019/0245691 | A1* | 8/2019 | Takemori | G06F 21/57 |
| 2020/0108700 | A1* | 4/2020 | Flanigan | G02F 1/0121 |
| 2020/0201959 | A1* | 6/2020 | Takemori | H04L 9/3213 |
| 2020/0259655 | A1* | 8/2020 | Woo | H04L 67/10 |

FOREIGN PATENT DOCUMENTS

| | | |
|---|---|---|
| CN | 104283937 | 1/2015 |
| FR | 3030818 A1 | 6/2016 |
| JP | 2008-85468 A | 4/2008 |
| JP | 2010-228907 A | 10/2010 |
| JP | 2012-191270 | 10/2012 |
| JP | 2013-45278 A | 3/2013 |
| JP | 2014-92957 A | 5/2014 |
| WO | 2015/129352 A1 | 9/2015 |
| WO | 2016/194118 A1 | 12/2016 |

OTHER PUBLICATIONS

Sep. 29, 2020 Extended European Search Report in European Application No. 18822657.5.
Keisuke Takemori, "In-Vehicle Network Security Using Secure Elements-Discussion of Security Technologies—", IEICE, IEICE Technical Report, vol. 114, No. 508, Mar. 2015, pp. 73-78, including English Abstract.
"Vehicle Identification Number (VIN)", Japanese Industrial Standards, JIS D 4901, 1982, 8 pages, including English translation.
Seiichiro Mizoguchi et al., "Implementation of Secure Remote Re-Programming Schemes", Computer Security Symposium, Oct. 4, 2016, vol. 2016, No. 2, Oct. 4, 2016, pp. 379-383, including English Abstract.
International Search Report issued in International Patent Application No. PCT/JP2018/023897, dated Sep. 25, 2018, including English translation, 4 pages.
Notice of Reasons for Rejection (Office Action) issued in Japanese Counterpart Patent Appl. No. 2017-125369, dated Oct. 15, 2019, along with an English translation thereof, 12 pages.
Dec. 24, 2021 Chinese Office Action in corresponding Chinese Application No. 201880041382.9.

* cited by examiner

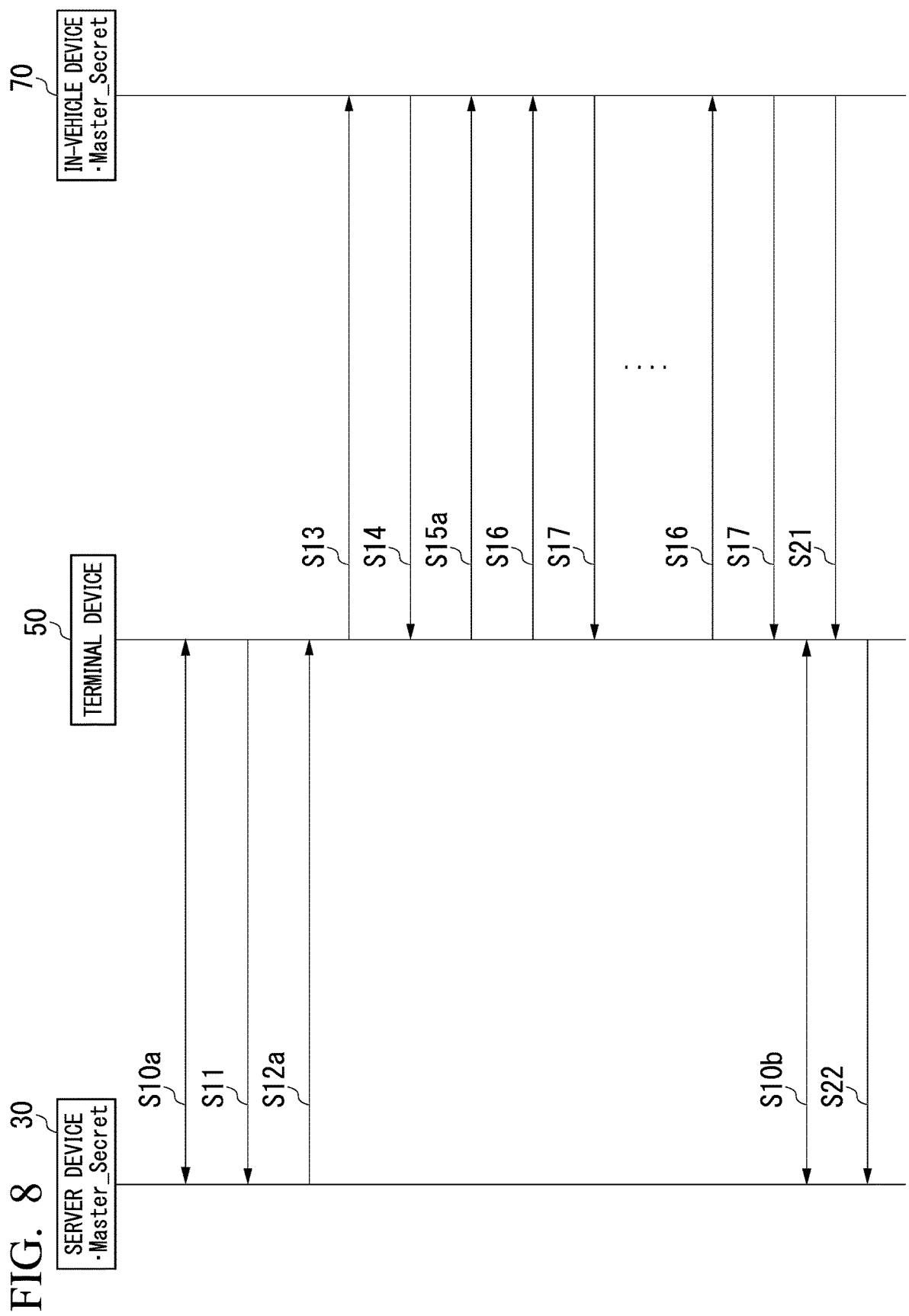

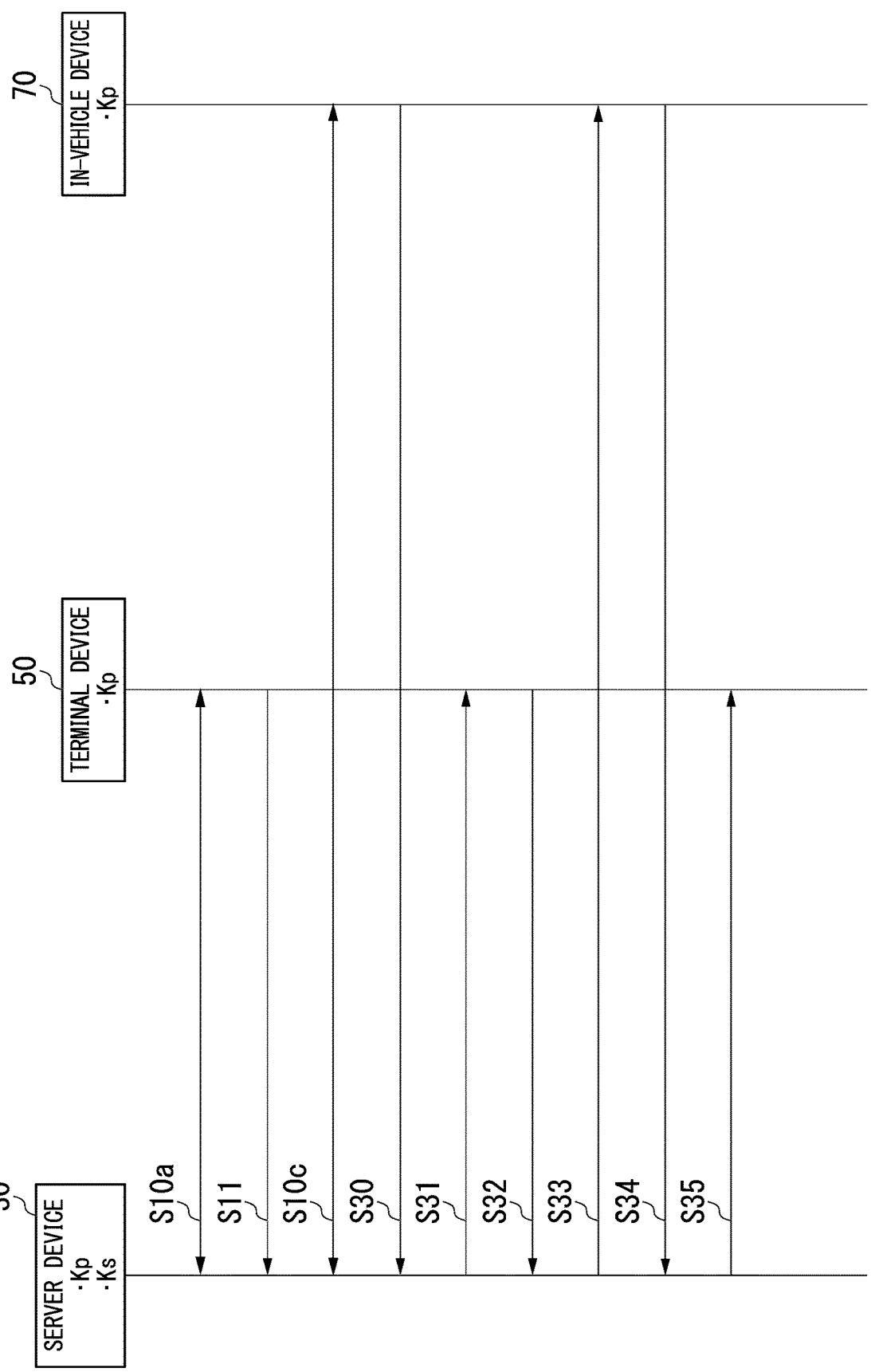

MAINTENANCE SYSTEM AND MAINTENANCE METHOD

TECHNICAL FIELD

The present invention relates to a maintenance system and a maintenance method.

Priority is claimed on Japanese Patent Application No. 2017-125369, filed Jun. 27, 2017, the content of which is incorporated herein by reference.

BACKGROUND ART

Conventionally, a car has an electronic control unit (ECU), and implements a function such as engine control through the ECU. The ECU is a type of computer and implements a desired function through a computer program. For example, security technology for an in-vehicle control system configured by connecting a plurality of ECUs to a controller area network (CAN) is described in Non-Patent Document 1.

CITATION LIST

Non-Patent Literature

[Non-Patent Document 1]
Keisuke TAKEMORI, "In-vehicle Network Security Using Secure Elements: Discussion of Security Technologies", Institute of Electronics, Information and Communication Engineers, Technical Report, vol. 114, no. 508, pp. 73-78, March 2015 [Non-Patent Document 2]
Japanese Industrial Standard, JIS D 4901, "Vehicle Identification Number (YIN)"

SUMMARY OF INVENTION

Problem to be Solved by the Invention

An objective is to improve security when maintenance work on a car is performed.

The present invention has been made in consideration of such circumstances and an objective of the present invention is to improve security when maintenance work on a vehicle such as a car is performed.

Means for Solving the Problem (1) According to an aspect of the present invention, a maintenance system includes: a server device; a terminal device; and an in-vehicle device installed in a vehicle, wherein the server device includes a worker authentication information reception unit configured to receive worker authentication information from the terminal device; a server authentication processing unit configured to perform an authentication process on the worker authentication information; and a server key transmission unit configured to transmit a first key to be used with the in-vehicle device to the terminal device whose worker authentication information has been successfully authenticated by the server authentication processing unit, wherein the terminal device includes a worker authentication information transmission unit configured to transmit the worker authentication information to the server device; a terminal key reception unit configured to receive the first key from the server device; and a terminal authentication processing unit configured to perform an authentication process with the in-vehicle device using the first key, and wherein the in-vehicle device includes a vehicle authentication processing unit configured to perform an authentication process with the terminal device using the first key.

(2) According to an aspect of the present invention, in the maintenance system according to the above-described (1), the server device includes a server key storage unit configured to store a master key; and a server key generation unit configured to generate the first key using the master key and a vehicle correspondence identifier associated with the worker authentication information, and the in-vehicle device includes a vehicle key storage unit configured to store the same master key as the master key of the server device; and a vehicle key generation unit configured to generate the first key using the master key of the vehicle key storage unit and the vehicle correspondence identifier corresponding to the vehicle.

(3) According to an aspect of the present invention, in the maintenance system according to the above-described (2), the server key generation unit is configured to further generate the first key using first period information indicating a predetermined period based on an authentication time of the worker authentication information, and the vehicle key generation unit is configured to further generate the first key using second period information indicating a predetermined period based on the time when the in-vehicle device has received an authentication request message from the terminal device.

(4) According to an aspect of the present invention, in the maintenance system according to the above-described (2) or (3), the server key generation unit is configured to generate a second key using the master key of the server key storage unit and the vehicle correspondence identifier associated with the worker authentication information, the vehicle key generation unit is configured to generate the second key using the master key of the vehicle key storage unit and the vehicle correspondence identifier corresponding to the vehicle, the server device includes a server encryption processing unit configured to encrypt authority information indicating authority to maintain the vehicle, assigned to a worker of the worker authentication information using the second key generated by the server key generation unit; and an authority information transmission unit configured to transmit the encrypted authority information in which the authority information is encrypted by the server encryption processing unit to the vehicle via the terminal device, and the in-vehicle device includes a vehicle encryption processing unit configured to decrypt the encrypted authority information using the second key generated by the vehicle key generation unit.

(5) According to an aspect of the present invention, the maintenance system according to any one of the above-described (1) to (4) includes a vehicle recording unit installed in the vehicle and configured to record a log of the in-vehicle device, the terminal device includes a terminal log transmission unit configured to receive the log from the vehicle and transmit the received log to the server device, and the server device includes a server recording unit configured to store the log received from the terminal device.

(6) According to an aspect of the present invention, in the maintenance system according to any one of the above-described (1) to (5), the server device includes a server control unit configured to limit the number of vehicles to which the first key is issued during the same period with respect to the same worker authentication information to a certain number.

(7) According to an aspect of the present invention, in the maintenance system according to any one of the above-described (1) to (6), the terminal device includes a terminal key storage unit configured to store the first key received from the server device; and a terminal control unit configured to cause the first key to be erased from the terminal key storage unit by a signal indicating an end of maintenance work on the vehicle.

(8) According to an aspect of the present invention, a maintenance system includes: a server device; a terminal device; and an in-vehicle device installed in a vehicle, wherein the server device includes a worker authentication information reception unit configured to receive worker authentication information from the terminal device; a server authentication processing unit configured to perform an authentication process on the worker authentication information; and a token transmission unit configured to transmit a token issued by the in-vehicle device to the terminal device whose worker authentication information has been successfully authenticated by the server authentication processing unit, wherein the terminal device includes a worker authentication information transmission unit configured to transmit the worker authentication information to the server device; a token reception unit configured to receive the token from the server device; and a terminal control unit configured to perform transmission of a maintenance command for the vehicle through the server device using the token, and wherein the in-vehicle device includes a vehicle control unit configured to issue the token and verify the token used in the transmission of the maintenance command.

(9) According to an aspect of the present invention, a maintenance method for use in a maintenance system includes a server device, a terminal device, and an in-vehicle device installed in a vehicle, the maintenance method including: transmitting, by the terminal device, worker authentication information to the server device; receiving, by the server device, the worker authentication information from the terminal device; performing, by the server device, an authentication process on the worker authentication information; transmitting, by the server device, a first key used with the in-vehicle device to the terminal device whose worker authentication information has been successfully authenticated by the authentication process; receiving, by the terminal device, the first key from the server device; performing, by the terminal device, an authentication process with the in-vehicle device using the first key; and performing, by the in-vehicle device, an authentication process with the terminal device using the first key.

(10) According to an aspect of the present invention, a maintenance method for use in a maintenance system includes a server device, a terminal device, and an in-vehicle device installed in a vehicle, the maintenance method including: transmitting, by the terminal device, worker authentication information to the server device; receiving, by the server device, the worker authentication information from the terminal device; performing, by the server device, an authentication process on the worker authentication information; issuing, by the in-vehicle device, a token; transmitting, by the server device, the token issued by the in-vehicle device to the terminal device whose worker authentication information has been successfully authenticated by the authentication process; receiving, by the terminal device, the token from the server device; performing, by the terminal device, transmission of a maintenance command for the vehicle through the server device using the token; and verifying, by the in-vehicle device, the token used in the transmission of the maintenance command.

Advantageous Effects of Invention

According to the present invention, it is possible to improve security when maintenance work on a vehicle such as a car is performed.

BRIEF DESCRIPTION OF DRAWINGS

FIG. 8 is a sequence chart showing example 4 of the maintenance method according to an embodiment.

FIG. 9 is a sequence chart showing example 5 of the maintenance method according to an embodiment.

DESCRIPTION OF EMBODIMENTS

Hereinafter, embodiments of the present invention will be described with reference to the drawings. Also, in the following embodiments, an example in which a car is used as the vehicle will be described.

Figure 1:
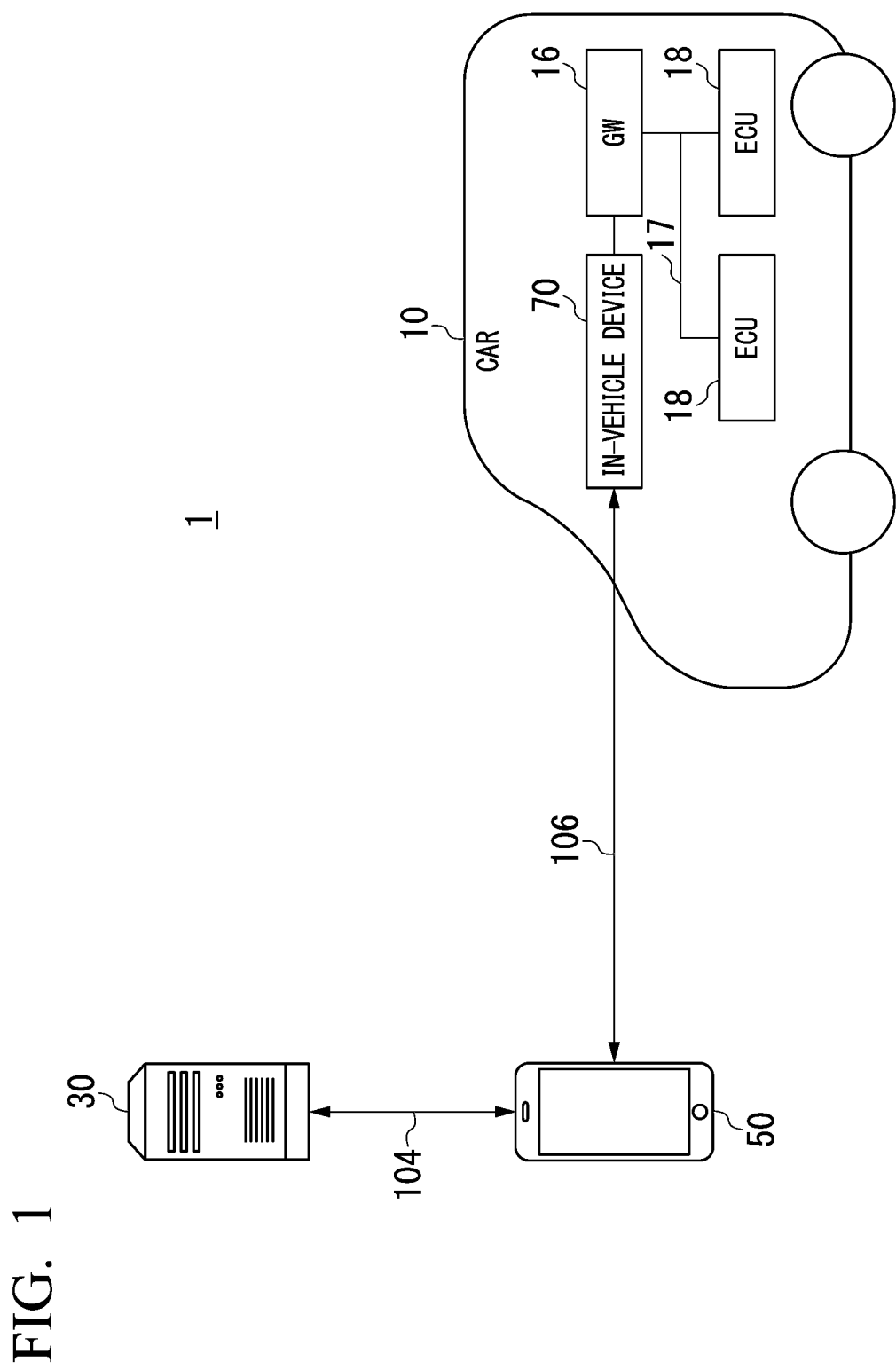
FIG. 1 is a schematic configuration diagram of a maintenance system according to an embodiment.

FIG. 1 is a schematic configuration diagram of a maintenance system 1 according to the present embodiment. In FIG. 1, the maintenance system 1 includes a server device 30, a terminal device 50, and an in-vehicle device 70. The in-vehicle device 70 is installed in a car 10. The car 10 includes the in-vehicle device 70, a gateway device (GW) 16, and a plurality of electronic control units (ECUs) 18.

The ECU 18 is an in-vehicle computer provided in the car 10. The ECU 18 has a control function such as engine control of the car 10. Examples of the ECU 18 include an ECU having an engine control function, an ECU having a steering-wheel control function, an ECU having a brake control function, and the like. The gateway device 16 has a function of data security (security) applied to the ECU 18 installed in the car 10. Also, any ECU installed in the car 10 may function as the gateway device 16.

The gateway device 16 and the plurality of ECUs 18 are connected to a communication network (hereinafter referred to as an in-vehicle network) 17 provided in the car 10. The in-vehicle network 17 may be, for example, a controller area network (CAN). The CAN is known as one of communication networks installed in vehicles. The gateway device 16 exchanges data with each ECU 18 via the in-vehicle network 17. The ECU 18 exchanges data with other ECUs 18 via the in-vehicle network 17.

Also, as a communication network installed in a vehicle, a communication network other than the CAN is provided in the car 10. The exchange of data between the gateway device 16 and the ECU 18 and between the ECUs 18 may be performed via the communication network other than the CAN. For example, the car 10 may include a local interconnect network (LIN). Also, the CAN and the LIN may be provided in the car 10. Also, the ECU 18 connected to the LIN may be provided in the car 10. Also, the gateway device 16 may be connected to the CAN and the LIN. Also, the gateway device 16 may exchange, via the CAN, data with the ECU 18 connected to the CAN and exchange, via the LIN, data with the ECU 18 connected to the LIN. Also, the ECUs 18 may exchange data with each other via the LIN.

An in-vehicle computer system of the car 10 is configured by connecting the gateway device 16 and the plurality of ECUs 18 to the in-vehicle network 17. The gateway device 16 monitors communication between the inside and the outside of the in-vehicle computer system of the car 10. The ECU 18 communicates with devices outside the in-vehicle computer system via the gateway device 16.

Also, as the configuration of the in-vehicle network 17, the in-vehicle network 17 may include a plurality of buses (communication lines) and the plurality of buses may be connected to the gateway device 16. In this case, one or more ECUs 18 are connected to one bus.

The server device 30 communicates with the terminal device 50 via a communication path 104. The communication path 104 may be a wireless communication path or a wired communication path or may include a wireless communication path and a wired communication path. For example, the server device 30 and the terminal device 50 may be connected by a communication cable.

Alternatively, the server device 30 and the terminal device 50 may be configured to perform communication via a wired or wireless communication network. For example, the server device 30 and the terminal device 50 may be connected by a wired or wireless local area network (LAN).

The terminal device 50 communicates with the in-vehicle device 70 of the car 10 via a communication path 106. The communication path 106 may be a wireless communication path or a wired communication path or may include a wireless communication path and a wired communication path. For example, the terminal device 50 and the in-vehicle device 70 may be configured to perform communication via a wired or wireless communication network. For example, the terminal device 50 and the in-vehicle device 70 may be connected by the wired or wireless LAN. For example, the terminal device 50 and the in-vehicle device 70 may be configured to perform communication according to near field wireless communication. For example, the terminal device 50 may be connected to a diagnostic port of the car 10 and the terminal device 50 and the in-vehicle device 70 may be configured to perform communication via the diagnostic port. For example, an on-board diagnostics (OBD) port may be used as a diagnostic port of the car 10.

Figure 2:
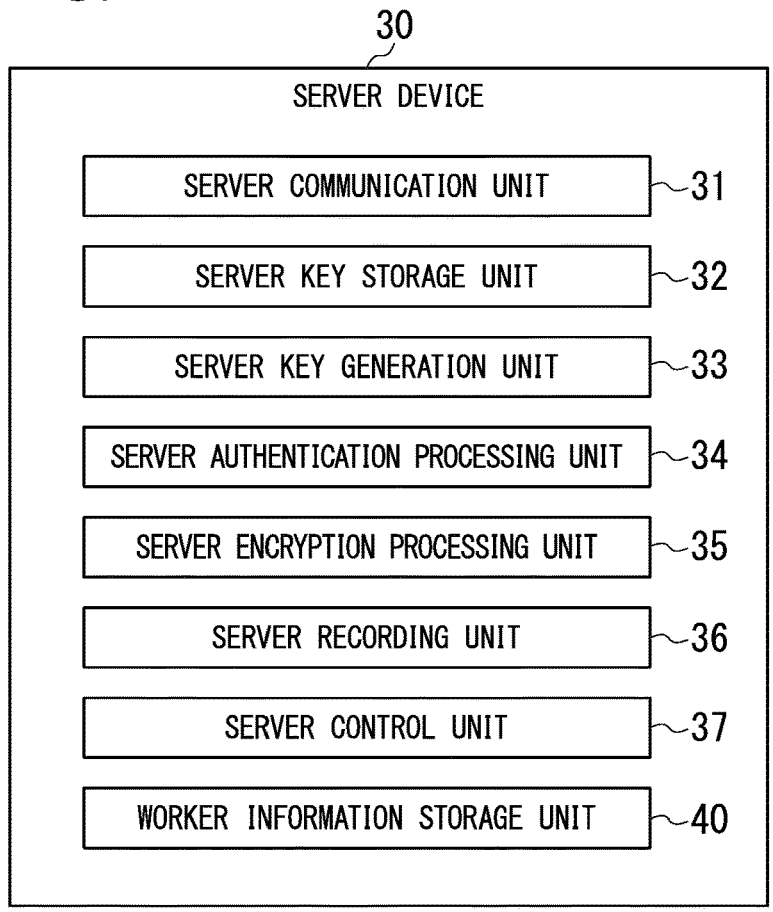
FIG. 2 is a schematic configuration diagram of a server device according to an embodiment.

FIG. 2 is a schematic configuration diagram of the server device 30 according to the present embodiment. In FIG. 2, the server device 30 includes a server communication unit 31, a server key storage unit 32, a server key generation unit 33, a server authentication processing unit 34, a server encryption processing unit 35, a server recording unit 36, a server control unit 37 and a worker information storage unit 40. The server communication unit 31 communicates with the terminal device 50 via the communication path 104. The server key storage unit 32 stores a key. The server key generation unit 33 generates the key. The server authentication processing unit 34 authenticates a worker of the car 10. The server encryption processing unit 35 encrypts data and decrypts encrypted data. The server recording unit 36 records and stores a log.

The server control unit 37 controls the server device 30.

The worker information storage unit 40 stores worker information. The worker information is information about the worker pre-registered as a person who performs maintenance work on the car 10. The worker information includes worker identification information for identifying the worker such as the worker's name and the like and worker authentication information associated with the worker identification information. The worker authentication information is information for authenticating the worker. The worker authentication information is, for example, a set of worker identification information (ID) and a password (PWD). Alternatively, the worker authentication information may be biometric information such as a fingerprint of the worker.

The server authentication processing unit 34 performs an authentication process on the worker authentication information received from the terminal device 50. The server authentication processing unit 34 determines the success/failure of the authentication of the worker authentication information received from the terminal device 50 by comparing the worker authentication information received from the terminal device 50 with the worker authentication information of the worker information of the worker information storage unit 40. For example, when worker authentication information indicating a "set of ID and PWD" received from the terminal device 50 matches worker authentication information indicating a "set of ID and PWD" of the worker information of the worker information storage unit 40, the authentication of the worker authentication information succeeds. Otherwise, the authentication of the worker authentication information fails. For example, when it is determined that the worker authentication information indicating the "worker's biometric information (for example, fingerprint information)" received from the terminal device 50 and the worker authentication information indicating the "fingerprint information" of the worker information of the worker information storage unit 40 are biometric information of the same person, the authentication of the worker authentication information succeeds. Otherwise, the authentication of the worker authentication information fails.

Also, the worker information storage unit 40 may be provided in a storage device outside the server device 30. In this case, the server device 30 accesses an external storage device by communication to acquire the worker information of the worker information storage unit 40.

The function of the server device 30 is implemented by a central processing unit (CPU) provided in the server device 30 executing a computer program. Also, the server device 30 may be configured using a general-purpose computer device or may be configured as a dedicated hardware device.

The server device 30 may include a secure element (SE). An example of a secure element may include a tamper-resistant semiconductor product. As a secure element, for example, a tamper-resistant integrated circuit (IC) chip may be used. As a secure element, for example, a communication module such as a subscriber identity module (SIM) or an embedded subscriber identity module (eSIM) may be used. The SIM and the eSIM are tamper-resistant.

The functions of the server key storage unit 32 and the server key generation unit 33 of the server device 30 may be implemented by a CPU of the secure element executing a computer program.

Figure 3:
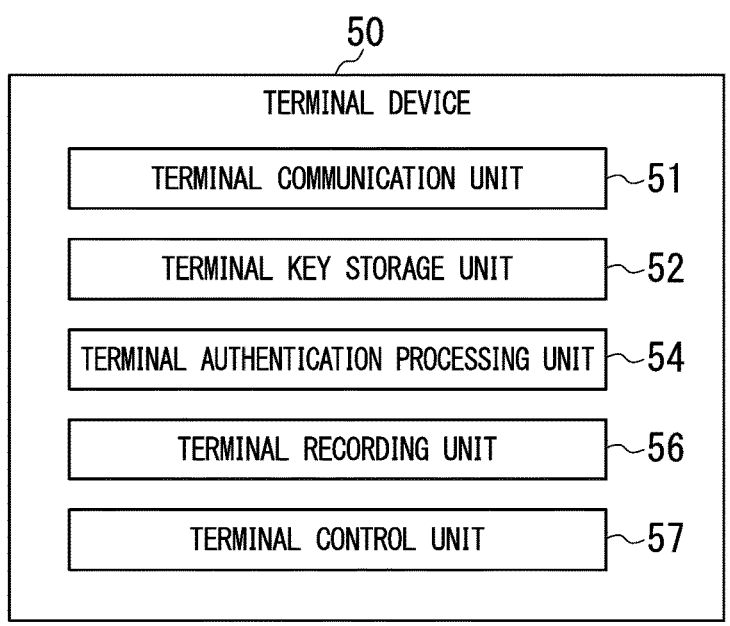
FIG. 3 is a schematic configuration diagram of a terminal device according to an embodiment.

FIG. 3 is a schematic configuration diagram of the terminal device 50 according to the present embodiment. In FIG. 3, the terminal device 50 includes a terminal communication unit 51, a terminal key storage unit 52, a terminal authentication processing unit 54, a terminal recording unit 56, and a terminal control unit 57. The terminal communication unit 51 communicates with the server device 30 via the communication path 104. The terminal communication unit 51 communicates with the in-vehicle device 70 of the car 10 via the communication path 106. The terminal key storage unit 52 stores a key. The terminal authentication processing unit 54 performs an authentication process with the in-vehicle device 70 of the car 10. The terminal recording unit 56 records and stores a log. The terminal control unit 57 controls the terminal device 50.

The function of the terminal device 50 is implemented by a CPU provided in the terminal device 50 executing a computer program. Also, the terminal device 50 may be configured using a general-purpose computer device or may be configured as a dedicated hardware device. Also, as the terminal device 50, a mobile communication terminal device such as a smartphone, a tablet computer device (a tablet PC), a stationary personal computer device, or the like may be used.

Figure 4:
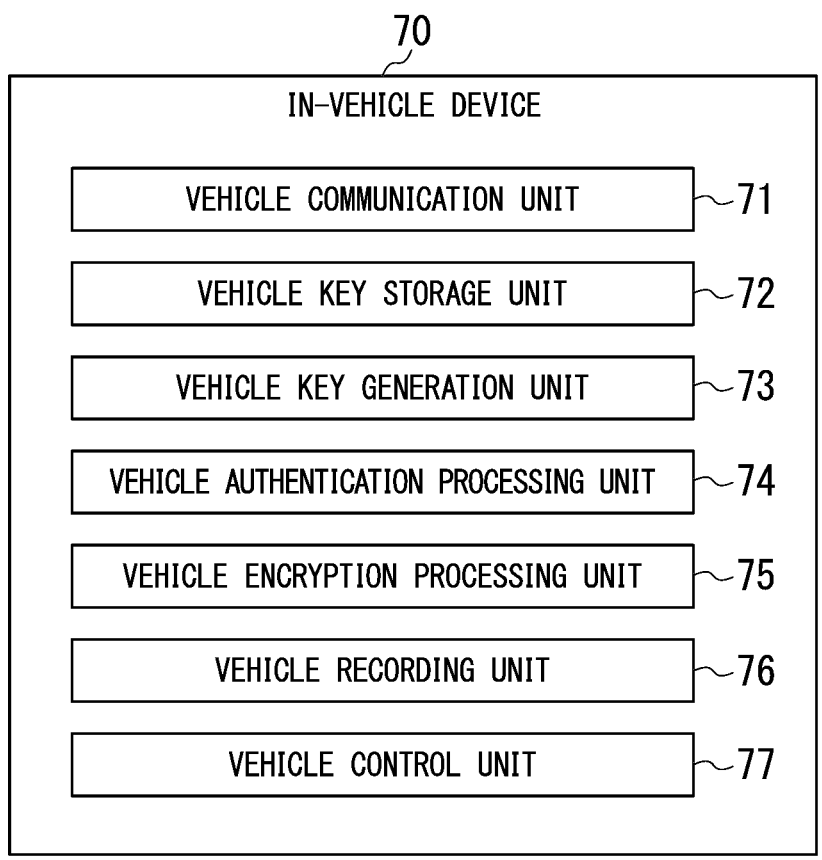
FIG. 4 is a schematic configuration diagram of an in-vehicle device according to an embodiment.

FIG. 4 is a schematic configuration diagram of the in-vehicle device 70 according to the present embodiment. In FIG. 4, the in-vehicle device 70 includes a vehicle communication unit 71, a vehicle key storage unit 72, a vehicle key generation unit 73, a vehicle authentication processing unit 74, a vehicle encryption processing unit 75, a vehicle recording unit 76, and a vehicle control unit 77. The vehicle communication unit 71 communicates with the terminal device 50 via the communication path 106. The vehicle key storage unit 72 stores a key. The vehicle key generation unit 73 generates the key. The vehicle authentication processing unit 74 performs an authentication process with the terminal device 50. The vehicle encryption processing unit 75 encrypts data and decrypts encrypted data. The vehicle recording unit 76 records and stores a log. The vehicle control unit 77 controls the in-vehicle device 70.

The function of the in-vehicle device 70 is implemented by a CPU provided in the in-vehicle device 70 executing a computer program. Also, the in-vehicle device 70 may be configured using a general-purpose computer device or may be configured as a dedicated hardware device.

The in-vehicle device 70 may include a secure element. An example of a secure element may include a tamper-resistant semiconductor product. As a secure element, for example, a tamper-resistant integrated circuit (IC) chip may be used. As a secure element, for example, a communication module such as a SIM or an eSIM may be used. The SIM and the eSIM are tamper-resistant. For example, a cryptographic processing chip such as a hardware security module (HSM) may be used as the secure element. The HSM is tamper-resistant.

The functions of the vehicle key storage unit 72 and the vehicle key generation unit 73 of the in-vehicle device 70 may be implemented by a CPU of the secure element executing a computer program.

Also, the in-vehicle device 70 may be implemented using a computer device installed in the car 10. For example, the in-vehicle device 70 may be implemented using an infotainment device installed in the car 10. Examples of the info-tainment device include those having a navigation function, a position information service function, a multimedia playback function for music, moving images, and the like, a speech communication function, a data communication function, an Internet connection function, and the like.

Infotainment devices are generally referred to as in-vehicle infotainment (IVI) systems. The function of the in-vehicle device 70 may be implemented by a CPU provided in the infotainment device executing a computer program for implementing the function of the in-vehicle device 70. The infotainment device may include a secure element such as a tamper-resistant IC chip.

Also, the in-vehicle device 70 may be implemented using a telecommunication unit (TCU) installed in the car 10. The TCU is a communication device. The TCU includes a SIM or an eSIM to which information for utilizing the wireless communication network is written. The TCU can connect to the wireless communication network to perform wireless communication using the SIM or the eSIM. The functions of the in-vehicle device 70 may be implemented by a CPU provided in the TCU executing a computer program for implementing the functions of the in-vehicle device 70. The SIM or the eSIM of the TCU is a secure element.

Also, the in-vehicle device 70 may be implemented using the gateway device 16 installed in the car 10. The functions of the in-vehicle device 70 may be implemented by a CPU provided in the gateway device 16 executing a computer program for implementing the functions of the in-vehicle device 70. The gateway device 16 may include a secure element such as an HSM.

Next, an example of the maintenance method according to the present embodiment will be sequentially described with reference to FIGS. 5 to 9. The maintenance method according to the present embodiment is executed when the worker performs maintenance work on the car 10. The maintenance work on the car 10 is performed when the car 10 is produced in a car manufacturing company or when the car 10 is maintained in a car maintenance factory, a car dealership, a storage place of the car 10 or the like. There are various items in the maintenance work on the car 10.

Examples of maintenance work on the car 10 include various types of diagnoses for the car 10, installation and updating of programs and setting data of the ECU 18, initialization of the ECU 18, and the like.

Also, in the following description of the example of the maintenance method, an example of the worker authentication method according to the present embodiment includes an ID/password authentication method using a set of worker identification information ID and a password PWD. In the ID/password authentication method, the set of the worker identification information ID and the password PWD is the worker authentication information. A set of worker identification information ID and a password PWD of an authorized worker is pre-registered in the worker information storage unit 40. Also, maintenance target vehicle limitation information for limiting the car 10 which is a target of maintenance work to be performed by the worker is stored in the worker information storage unit 40 in association with the set of the worker identification information ID and the password PWD of the worker. The maintenance target vehicle limitation information is, for example, a vehicle identification number (VIN) of the car 10 that is the target of the maintenance work. The vehicle identification number (VIN) is described, for example, in Non-Patent Document 2.

Example 1 of Maintenance Method

Figure 5:
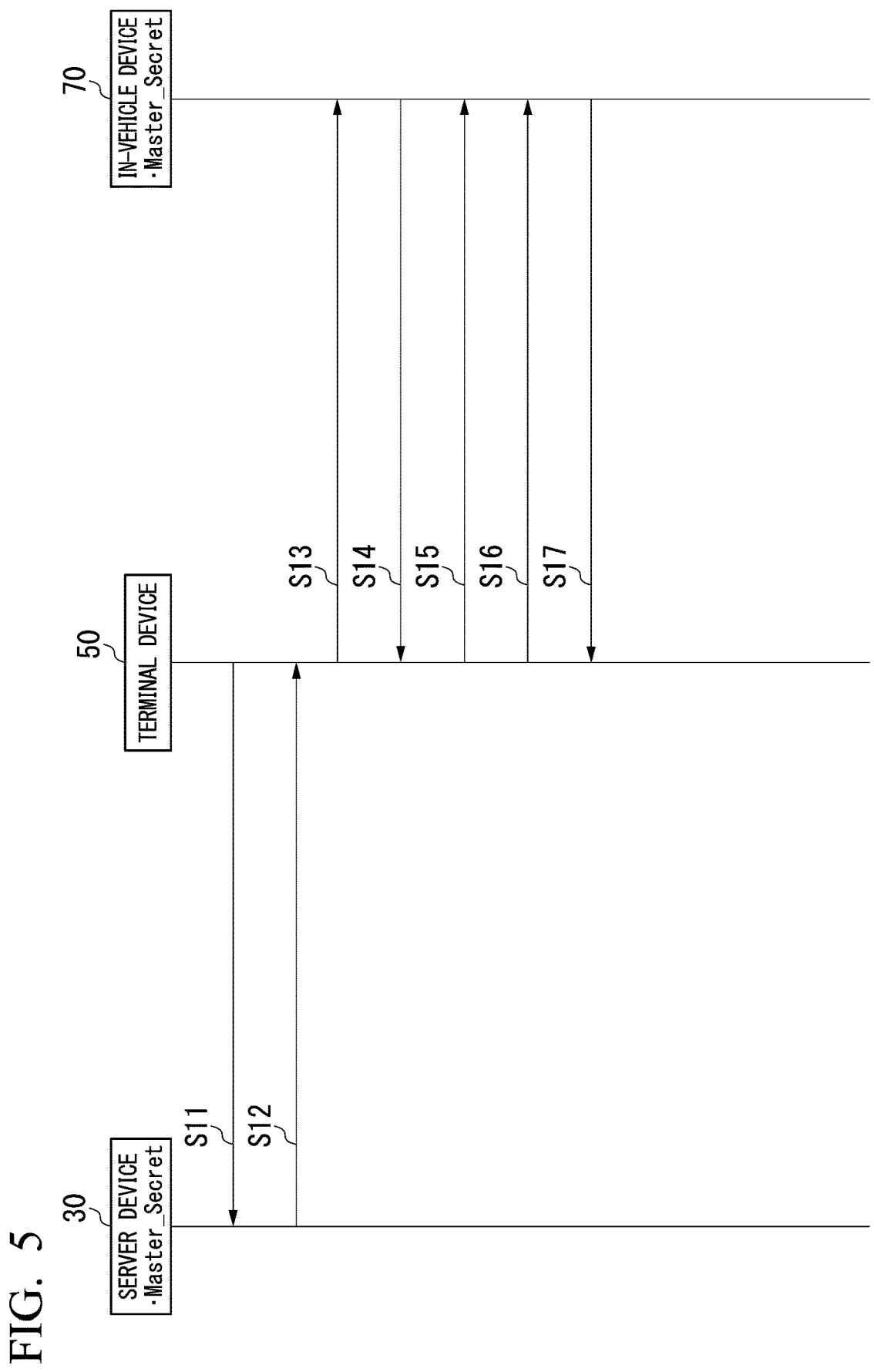
FIG. 5 is a sequence chart showing example 1 of a maintenance method according to an embodiment.

Example 1 of the maintenance method according to the present embodiment will be described with reference to FIG. 5. FIG. 5 is a sequence chart showing example 1 of the maintenance method according to the present embodiment.

The server device 30 pre-stores a master key Master_Secret in the server key storage unit 32. The in-vehicle device 70 pre-stores the master key Master_Secret in the vehicle key storage unit 72. The master key Master_Secret stored in the server key storage unit 32 by the server device 30 is the same as the master key Master_Secret stored in the vehicle key storage unit 72 by the in-vehicle device 70.

(Step S11) The worker inputs worker identification information ID and a password PWD for logging into the server device 30 by means of the terminal device 50. Also, the worker inputs, by means of the terminal device 50, the vehicle identification number VIN of the car 10 which is the target of the maintenance work to be performed. The terminal communication unit 51 of the terminal device 50 transmits a login request message including a set of the worker identification information ID and the password PWD and the vehicle identification number VIN input from the worker to the terminal device 50 to the server device 30. The vehicle identification number corresponds to a vehicle correspondence identifier.

The server communication unit 31 of the server device 30 receives the login request message from the terminal device 50. The server authentication processing unit 34 authenticates the login request message received from the terminal device 50 by means of the server communication unit 31. The server authentication processing unit 34 compares the set of the worker identification information ID and the password PWD of the login request message with a set of worker identification information ID and a password PWD of the worker information storage unit 40. When a result is that the set of the worker identification information ID and the password PWD of the login request message matches the set of the worker identification information ID and the password PWD of the worker information storage unit 40, the authentication of the login request message (worker authentication information) succeeds. Otherwise, the authentication of the login request message (worker authentication information) fails.

Also, when the vehicle identification number VIN of the maintenance target vehicle limitation information is associated with the set of the worker identification information ID and the password PWD of the worker information storage unit 40, the server authentication processing unit 34 further determines whether or not the vehicle identification number VIN of the login request message matches the vehicle identification number VIN of the maintenance target vehicle limitation information. When a result is that the vehicle identification number VIN of the login request message matches the vehicle identification number VIN of the maintenance target vehicle limitation information, the authentication of the login request message (worker authentication information) finally succeeds. Otherwise, the authentication of the login request message (worker authentication information) fails.

When the authentication on the login request message succeeds, the process proceeds to the subsequent processing. On the other hand, when the authentication on the login request message fails, the process of FIG. 5 ends.

When the authentication on the login request message fails, logging into the server device 30 from the terminal device 50 fails. When the authentication on the login request message fails, the server device 30 may execute a predetermined error process.

(Step S12) The server key generation unit 33 generates a MAC key Ka using the master key Master_Secret of the server key storage unit 32, the vehicle identification number VIN of the login request message whose authentication has succeeded, and period information. A method of generating the MAC key Ka is represented by the following equation. The MAC key Ka corresponds to a first key.

MAC key Ka=digest (Master_Secret, VIN, period information)

Here, Master_Secret is a master key. VIN is the vehicle identification number. The period information is information indicating a predetermined period based on an authentication time of worker authentication information. The authentication time of the worker authentication information may be the time when the server communication unit 31 receives the worker authentication information from the terminal device 50 or when the server authentication processing unit 34 performs the authentication process on the worker authentication information. As an example of the present embodiment, the worker authentication information is a set of worker identification information ID and a password PWD and the login request message is a message including the worker authentication information.

An example of the period information is shown below. The authentication time of the worker authentication information is referred to as a login time for convenience of description. Thereby, the period information is information indicating a predetermined period based on the login time.

Example 1 of Period Information

When the login time is "2017-06-12 10:15:20", the period information is "2017-06-12". In example 1 of the period information, only year/month/day information within date and time information of the login time is used for the period information. Therefore, in example 1 of the period information, the period information is generated by omitting information of a clock time (hour/minute/second) within the date and time information of the login time. According to example 1 of the period information, the period information is information indicating the date of the login time.

Example 2 of Period Information

When the login time is "2017-06-12 10:15:20", the period information is "2017-06". In example 2 of period information, only year/month information within the date and time information of the login time is used for the period information. Therefore, in example 2 of the period information, the period information is generated by omitting information of a day and a clock time (hour/minute/second) within the date and time information of the login time. According to example 2 of the period information, the period information is information indicating the month and year of the login time.

As modified examples of example 1 and example 2 of the above-described period information, only year information within date and time information of the login time may be used for the period information (i.e., information about the month and day and a clock time (hour/minute/second) is omitted) or only year/month/day and hour information within date and time information of the login time may be used for the period information (i.e., minute/second information within the clock time is omitted).

The above is a description of examples of the period information.

The MAC key Ka is a digest generated using the master key Master_Secret, the vehicle identification number VIN, and the period information. Examples of the digest include a value calculated by a hash function, a value calculated by an exclusive OR operation, or the like. For example, the MAC key Ka is a hash function value calculated using the master key Master_Secret, the vehicle identification number VIN, and the period information for an input value. As the digest, a cipher-based message authentication code (CMAC) may be used.

For example, the MAC key Ka is a CMAC (Master_Secret; a YIN and period information). Here, in CMAC (A; B), a key A is a key used to generate the CMAC, and data B is data to be generated for the CMAC. Thereby, the MAC key Ka is a "CMAC of concatenation data of the vehicle identification number VIN and the period information" to be generated using the master key Master_Secret.

The above is a description of methods of generating the MAC key Ka.

Description will return to FIG. 5.

The server communication unit 31 returns the MAC key Ka generated by the server key generation unit 33 to the terminal device 50 that is a transmission source of the login request message whose authentication has succeeded. Logging into the server device 30 from the terminal device 50 to which the MAC key Ka is returned succeeds.

The terminal communication unit 51 of the terminal device 50 receives the MAC key Ka from the server device 30. The terminal key storage unit 52 stores the MAC key Ka received from the server device 30 by means of the terminal communication unit 51.

Also, the server recording unit 36 records a log with respect to a login request message received from the terminal device 50, authentication of the login request message, and the like as needed. The log includes information such as a login request message, a reception date and time of the login request message, an authentication result (success or failure) of the login request message, and a transmission date and time of the MAC key Ka.

(Step S13) The terminal authentication processing unit 54 of the terminal device 50 transmits a challenge (a random number t) to the in-vehicle device 70 of the car 10 by means of the terminal communication unit 51. The terminal authentication processing unit 54 generates the random number t and uses the random number t for the challenge. The terminal authentication processing unit 54 holds the challenge (the random number t).

In the in-vehicle device 70 of the car 10, the vehicle communication unit 71 receives the challenge (the random number t) from the terminal device 50. The challenge (the random number t) corresponds to the authentication request message.

(Step S14) When the vehicle communication unit 71 receives the challenge (the random number t) from the terminal device 50, the vehicle key generation unit 73 generates the MAC key Ka.

A method in which the vehicle key generation unit 73 generates the MAC key Ka is represented by the following equation of a method that is the same as that of the server key generation unit 33 in step S12 described above.

MAC key Ka=digest (Master_Secret, VIN, period information)

Here, the master key Master_Secret is the master key Master_Secret stored in the vehicle key storage unit 72. The master key Master_Secret stored in the vehicle key storage unit 72 is the same as the master key Master_Secret stored in the server key storage unit 32 of the server device 30. The vehicle identification number VIN is a vehicle identification number VIN of the car 10 in which the in-vehicle device 70 of the vehicle key generation unit 73 is installed. The period information is information indicating a predetermined period based on the time when the in-vehicle device 70 receives an authentication request message from the terminal device 50 (an authentication request message reception time). This period information is similar to the period information used to generate the MAC key Ka in the above-described server key generation unit 33, but is generated by changing the login time when receiving the authentication request message.

For example, in the above-described example 1 of the period information, when the authentication request message reception time is "2017-06-12 16:20:40," the period information used to generate the MAC key Ka in the vehicle key generation unit 73 is "2017-06-12". Here, when the time of logging into the server device 30 from the terminal device 50 is "2017-06-12 10:15:20", the period information used to generate the MAC key Ka in the server key generation unit 33 and the period information used to generate the MAC key Ka in the vehicle key generation unit 73 are the same period information of "2017-06-12". Thereby, even if there is a difference between a clock time at which the worker logs into the server device 30 by means of the terminal device 50 and a clock time at which the terminal device 50 transmits an authentication request message to the in-vehicle device 70 of the car 10, the period information used to generate the MAC key Ka is the same between the server device 30 and the in-vehicle device 70 in the case of the same date. Thus, the same MAC key Ka is generated by the server device 30 and the in-vehicle device 70. Thereby, the MAC key Ka transmitted from the server device 30 to the terminal device 50 and stored in the terminal key storage unit 52 of the terminal device 50 in the above-described step S12 is the same as the MAC key Ka generated by the in-vehicle device 70 receiving the authentication request message (the challenge (the random number t)) from the terminal device 50.

For example, in the above-described example 2 of the period information, when the authentication request message reception time is "2017-06-25 16:20:40," the period information used to generate the MAC key Ka in the vehicle key generation unit 73 is "2017-06". Here, when the time of logging into the server device 30 from the terminal device 50 is "2017-06-12 10:15:20", the period information used to generate the MAC key Ka in the server key generation unit 33 and the period information used to generate the MAC key Ka in the vehicle key generation unit 73 are the same period information of "2017-06". Thereby, even if there is a difference between a date and time when the worker logs into the server device 30 by means of the terminal device 50 and a date and time when the terminal device 50 transmits an authentication request message to the in-vehicle device 70 of the car 10, the period information used to generate the MAC key Ka is the same between the server device 30 and the in-vehicle device 70 in the case of the same month and year. Thus, the same MAC key Ka is generated by the server device 30 and the in-vehicle device 70. Thereby, the MAC key Ka transmitted from the server device 30 to the terminal device 50 and stored in the terminal key storage unit 52 of the terminal device 50 in the above-described step S12 is the same as the MAC key Ka generated by the in-vehicle device 70 receiving the authentication request message (the challenge (the random number t)) from the terminal device 50.

Also, when a difference between the time when the worker logs into the server device 30 by means of the terminal device 50 and the time when the authentication request message is transmitted from the terminal device 50 to the in-vehicle device 70 of the car 10 exceeds an allowable range of the period information, the period information used to generate the MAC key Ka is different between the server device 30 and the in-vehicle device 70. Thereby, the server device 30 and the in-vehicle device 70 generate different MAC keys Ka. For example, when the time of logging into the server device 30 from the terminal device 50 is "2017-06-12 10:15:20" and the authentication request message reception time is "2017-06-13 00:05:10" in the above-described example 1 of the period information, the period information used to generate the MAC key Ka in the server key generation unit 33 is "2017-06-12" and the period information used to generate the MAC key Ka in the vehicle key generation unit 73 is "2017-06-13". Because the period information used to generate the MAC key Ka in the server key generation unit 33 is different from the period information used to generate the MAC key Ka in the vehicle key generation unit 73, the server device 30 and the in-vehicle device 70 generate different MAC keys Ka. Therefore, the MAC key Ka transmitted from the server device 30 to the terminal device 50 and stored in the terminal key storage unit 52 of the terminal device 50 in the above-described step S12 is different from the MAC key Ka generated by the in-vehicle device 70 receiving the authentication request message (the challenge (the random number t)) from the terminal device 50. In this case, although this will be described below, verification using the MAC key Ka of the server device 30 with respect to a response Ka (a random number t) generated from the challenge (the random number t) using the MAC key Ka generated by the in-vehicle device 70 fails.

Also, when the difference between the time when the worker logs into the server device 30 by means of the terminal device 50 and the time when the authentication request message is transmitted from the terminal device 50 to the in-vehicle device 70 of the car 10 exceeds the allowable range of the period information, the worker logs into the server device 30 from the terminal device 50 again. Thereby, it is possible to cause the period information of the server device 30 to match the period information of the in-vehicle device 70.

The vehicle key storage unit 72 stores the MAC key Ka generated by the vehicle key generation unit 73. The vehicle authentication processing unit 74 generates the response Ka (the random number t) using the MAC key Ka of the vehicle key storage unit 72 and the challenge (the random number t) received from the terminal device 50 by the vehicle communication unit 71. The response generation/verification method is preset in the vehicle authentication processing unit 74. The response Ka (the random number t) is encrypted data obtained by encrypting the random number t with the MAC key Ka as an example according to the present embodiment.

Also, the response Ka (the random number t) may be a CMAC (Ka; random number t) as an example according to the present embodiment. The CMAC (Ka; random number t) is a "CMAC of the random number t" generated using the MAC key Ka.

The vehicle authentication processing unit 74 returns a response Ka (a random number t) and a challenge (a random number v) to the terminal device 50 that is the transmission source of the challenge (the random number t) by means of the vehicle communication unit 71. The vehicle authentication processing unit 74 generates the random number v and uses the random number v for the challenge. The vehicle authentication processing unit 74 holds the challenge (the random number v).

The terminal communication unit 51 of the terminal device 50 receives the response Ka (the random number t) and the challenge (the random number v) from the in-vehicle device 70 of the car 10.

(Step S15) The terminal authentication processing unit 54 verifies the response Ka (the random number t) received from the in-vehicle device 70 by the terminal communication unit 51. As the response generation/verification method, a method that is the same as the response generation/verification method in the vehicle authentication processing unit 74 of the in-vehicle device 70 is preset in the terminal authentication processing unit 54. In the verification of the response Ka (the random number t), the terminal authentication processing unit 54 uses the challenge (random number t) transmitted to and held in the in-vehicle device 70 of the car 10 in the above-described step S13 and the MAC key Ka of the terminal key storage unit 52.

For example, when the response Ka (the random number t) is encrypted data of the random number t based on the MAC key Ka, the terminal authentication processing unit 54 encrypts the challenge (the random number t) using the MAC key Ka and compares the encrypted data generated by the encryption with the response Ka (the random number t). As a result of this comparison, the verification of the response Ka (the random number t) succeeds if both match and the verification of the response Ka (the random number t) fails if both do not match.

Also, as another verification method when the response Ka (the random number t) is the encrypted data of the random number t based on the MAC key Ka, the terminal authentication processing unit 54 may decrypt the response Ka (the random number t) using the MAC key Ka and compare a decryption result with the challenge (the random number t). As a result of this comparison, the verification of the response Ka (the random number t) succeeds if both match and the verification of the response Ka (the random number t) fails if both do not match.

For example, when the response Ka (the random number t) is the CMAC (Ka; random number t), the terminal authentication processing unit 54 generates a CMAC of a challenge (a random number t) using the MAC key Ka and compares the generated CMAC with the response Ka (the random number t). As a result of this comparison, the verification of the response Ka (the random number t) succeeds if both match and the verification of the response Ka (the random number t) fails if both do not match.

When the verification of the response Ka (the random number t) succeeds, the process proceeds to the subsequent processing. On the other hand, when the verification of the response Ka (the random number t) fails, the process of FIG. 5 ends. When the verification of the response Ka (the random number t) fails, the terminal device 50 may execute a predetermined error process.

The terminal authentication processing unit 54 generates the response Ka (the random number v) using the MAC key Ka of the terminal key storage unit 52 and the challenge (the random number v) received from the in-vehicle device 70 by means of the terminal communication unit 51. The terminal authentication processing unit 54 returns the response Ka (the random number v) to the in-vehicle device 70 of the car 10 that is the transmission source of the challenge (the random number v) by means of the terminal communication unit 51.

The vehicle communication unit 71 of the in-vehicle device 70 of the car 10 receives the response Ka (the random number v) from the terminal device 50. The vehicle authentication processing unit 74 verifies the response Ka (the random number v) received from the terminal device 50. In the verification of the response Ka (the random number v), the vehicle authentication processing unit 74 uses the challenge (the random number v) transmitted to and held in the terminal device 50 in the above-described step S14 and the MAC key Ka of the vehicle key storage unit 72. A method of verifying the response Ka (the random number v) is similar to a method in which the above-described terminal authentication processing unit 54 verifies the response Ka (the random number t).

When the verification of the response Ka (the random number v) succeeds, the process proceeds to the subsequent processing. On the other hand, when the verification of the response Ka (the random number v) fails, the process of FIG. 5 ends. When the verification of the response Ka (the random number v) fails, the in-vehicle device 70 may execute a predetermined error process.

Also, the terminal recording unit 56 records a log with respect to authentication between the own terminal device 50 and the in-vehicle device 70 as needed. Also, the vehicle recording unit 76 records a log with respect to authentication between the in-vehicle device 70 and the terminal device 50 as needed.

(Step S16) The terminal control unit 57 of the terminal device 50 transmits a maintenance command to the in-vehicle device 70 of the car 10. The maintenance command is control information of maintenance (maintenance control information) of the car 10. The terminal control unit 57 may transmit the maintenance command to the in-vehicle device 70 of the car 10 according to an operation of the worker or transmit the maintenance command to the in-vehicle device 70 of the car 10 in accordance with a preset maintenance operation procedure. The vehicle communication unit 71 of the in-vehicle device 70 of the car 10 receives the maintenance command from the terminal device 50.

(Step S17) The vehicle control unit 77 transfers the maintenance command received from the terminal device 50 by the vehicle communication unit 71 to the in-vehicle device of the car 10 that executes the maintenance command. Examples of the in-vehicle device of the car 10 that executes the maintenance command include the gateway device 16 and the ECU 18. The in-vehicle device 70 itself receiving the maintenance command from the terminal device 50 may execute the maintenance command.

The vehicle control unit 77 receives a result of executing the maintenance command from the in-vehicle device that is a maintenance command transmission destination. The vehicle control unit 77 returns a maintenance response including the result of executing the maintenance command to the terminal device 50 by means of the vehicle communication unit 71.

Also, the vehicle recording unit 76 records a log with respect to the maintenance command and the maintenance response as needed. Also, the terminal recording unit 56 records a log with respect to the operation of the maintenance work of the worker, the maintenance command, and the maintenance response as needed.

According to example 1 of the maintenance method described above, the server device 30 authenticates the worker authentication information received from the terminal device 50 and transmits the MAC key Ka generated using the master key and the vehicle identification number VIN associated with the worker authentication information to the terminal device 50 whose worker authentication information has been successfully authenticated. The terminal device 50 performs an authentication process with the in-vehicle device 70 of the car 10 using the MAC key Ka received from the server device 30. The in-vehicle device 70 of the car 10 performs an authentication process with the terminal device 50 using the MAC key Ka generated using the master key and the vehicle identification number VIN of the car 10. Thereby, the in-vehicle device 70 of the car 10 that is a maintenance work target can authenticate that the terminal device 50 is operated by an authorized person for which the server device 30 has performed identity verification based on authentication of the worker authentication information. This enables security to be improved when the maintenance work on the car 10 is performed. For example, even when the terminal device 50 is operated by an unauthorized person due to loss or theft of the terminal device 50 or the like, the terminal device 50 cannot acquire a correct MAC key Ka if logging into the server device 30 from the terminal device 50 fails. Thereby, even if there is access from the terminal device 50 to the in-vehicle device 70 of the car 10, it is not possible to perform the maintenance work on the car 10 using the terminal device 50 because the authentication between the terminal device 50 and the in-vehicle device 70 fails.

Also, according to example 1 of the maintenance method, the period information is used to generate the MAC key Ka. Thus, even if the correct MAC key Ka is temporarily held in the terminal device 50, the authentication between the terminal device 50 and the in-vehicle device 70 fails even when the MAC key Ka is used if the period information exceeds the allowable range. Thereby, the maintenance work on the car 10 cannot be performed using the terminal device 50. Also, even if the period information of the MAC key Ka held by the terminal device 50 exceeds the allowable range, any authorized worker can acquire a correct MAC key Ka from the server device 30 to the terminal device 50 by logging into the server device 30 by means of the terminal device 50 again. Thus, the maintenance work on the car 10 can be performed using the terminal device 50.

Also, the period information may not be used to generate the MAC key Ka. Alternatively, the period information used to generate the MAC key Ka may be the same fixed value in the server device 30 and the in-vehicle device 70. When the period information is not used to generate the MAC key Ka or when the period information of the same fixed value in the server device 30 and the in-vehicle device 70 is used to generate the MAC key Ka, the MAC key Ka becomes a key usable during any period.

Example 2 of Maintenance Method

Figure 6:
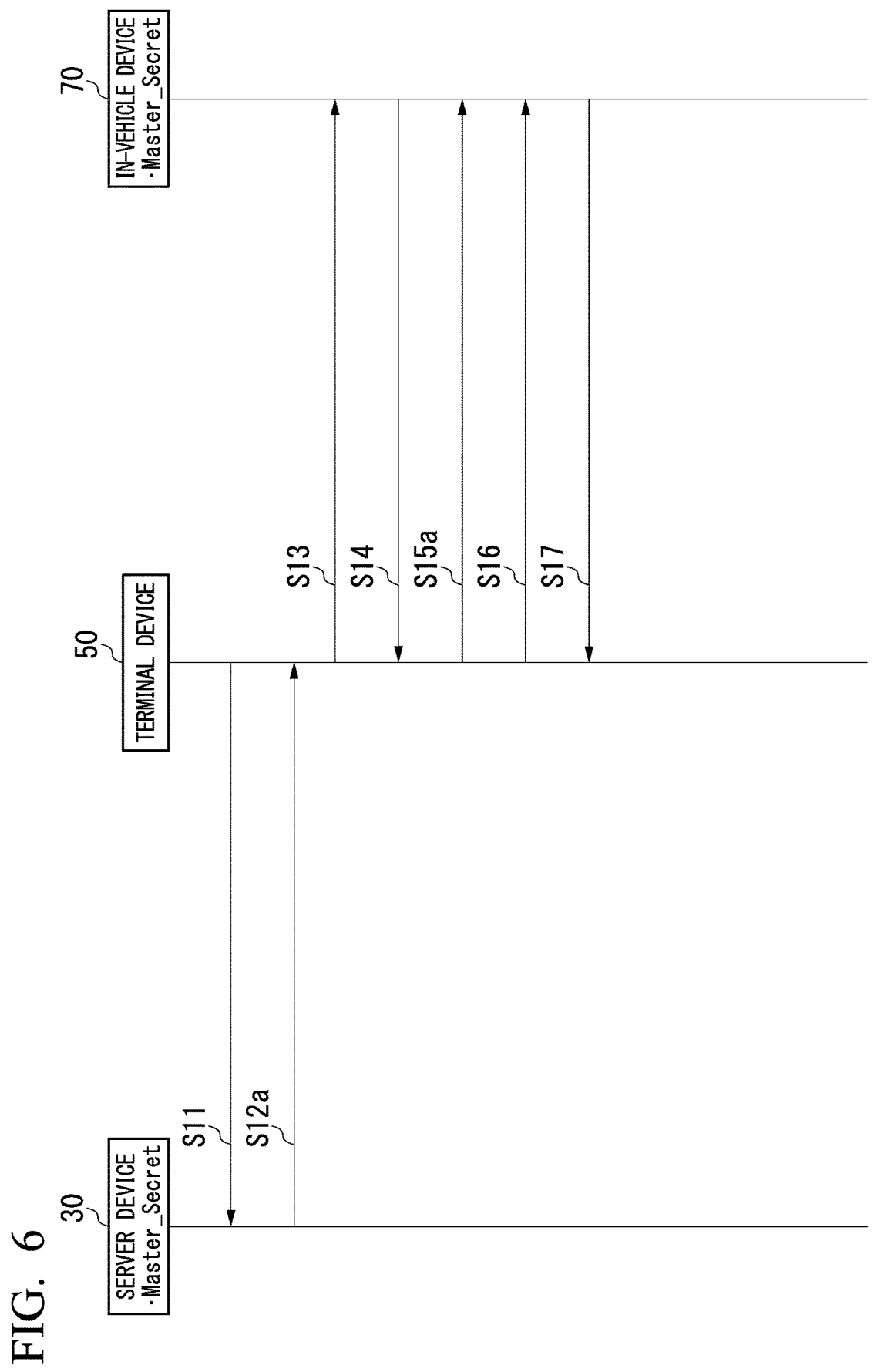
FIG. 6 is a sequence chart showing example 2 of the maintenance method according to an embodiment.

Example 2 of the maintenance method according to the present embodiment will be described with reference to FIG. 6. FIG. 6 is a sequence chart showing example 2 of the maintenance method according to the present embodiment. In FIG. 6, parts corresponding to the respective steps of FIG. 5 are denoted by the same reference signs. As in example 1 of the maintenance method, the server key storage unit 32 of the server device 30 and the vehicle key storage unit 72 of the in-vehicle device 70 pre-store the same master key Master_Secret. Hereinafter, differences from example 1 of the maintenance method will be mainly described.

Step S11 is the same as that of example 1 of the maintenance method. When the authentication on the login request message succeeds, step S12$a$ is executed.

(Step S12$a$) The server key generation unit 33 generates a MAC key Ka and an encryption key Kc using a master key Master_Secret of the server key storage unit 32, a vehicle identification number VIN of a login request message whose authentication has succeeded, period information, and key type information Key_ID(Nk). Nk is a variable representing a type of key. A method of generating the MAC key Ka and the encryption key Kc is represented by the following equation. The MAC key Ka corresponds to a first key. The encryption key Kc corresponds to a second key.

MAC key Ka=digest (Master_Secret, VIN, period information, Key_ID(mac))

Encryption key Kc=digest (Master_Secret, VIN, period information, Key_ID(kc))

Here, the master key Master_Secret, the vehicle identification number VIN, the period information, and the digest are similar to those of the description of step S12 in example 1 of the maintenance method described above. Key_ID (mac) is key type information indicating a MAC key. Key_ID(kc) is key type information indicating an encryption key.

The server encryption processing unit 35 encrypts authority information with the encryption key Kc to generate encrypted authority information Kc (authority information). The authority information is information indicating the authority to maintain the car 10 given to the worker of the worker authentication information of the login request message whose authentication has succeeded in step S11. The authority information is included in the worker information and pre-stored in the worker information storage unit 40. Also, examples of the authority to maintain the car 10 include general authority to perform only the work of general maintenance items and special authority to perform the work of security items especially related to the security of the car 10.

The server communication unit 31 returns the MAC key Ka generated by the server key generation unit 33 and the encrypted authority information Kc (the authority information) generated by the server encryption processing unit 35 to the terminal device 50 that is the transmission source of the login request message whose authentication has succeeded. Logging into the server device 30 from the terminal device 50 to which the MAC key Ka and the encrypted authority information Kc (the authority information) are returned succeeds.

The terminal communication unit 51 of the terminal device 50 receives the MAC key Ka and the encrypted authority information Kc (the authority information) from the server device 30. The terminal key storage unit 52 stores the MAC key Ka received from the server device 30 by means of the terminal communication unit 51. The terminal authentication processing unit 54 holds the encrypted authority information Kc (the authority information) received from the server device 30 by means of the terminal communication unit 51.

Also, the server recording unit 36 records a log with respect to a login request message received from the terminal device 50, the authentication of the login request message and the like as needed. The log includes information such as the login request message, a reception date and time of the login request message, an authentication result (success or failure) of the login request message, and a transmission date and time of the MAC key Ka and the encrypted authority information Kc (the authority information).

Steps S13 and S14 are the same as those of example 1 of the maintenance method. Here, the vehicle key generation unit 73 of the in-vehicle device 70 generates the MAC key Ka and the encryption key Kc. A method in which the vehicle key generation unit 73 generates the MAC key Ka and the encryption key Kc is represented by the following equation of a method that is the same as that of the server key generation unit 33 in step S12a described above.

MAC key Ka=digest (Master_Secret, VIN, period information, Key_ID(mac))

Encryption key Kc=digest (Master_Secret, VIN, period information, Key_ID(kc))

Here, the master key Master_Secret, the vehicle identification number VIN, the period information, and the digest are similar to those of the description of step S14 in example 1 of the maintenance method described above. Key_ID (mac) is key type information indicating a MAC key. Key_ID(kc) is key type information indicating an encryption key.

The vehicle key storage unit 72 stores the MAC key Ka and the encryption key Kc generated by the vehicle key generation unit 73.

(Step S15a) The terminal authentication processing unit 54 verifies the response Ka (the random number t) received from the in-vehicle device 70 by the terminal communication unit 51. The verification of the response Ka (the random number t) is the same as that of step S15 of example 1 of the maintenance method.

When the verification of the response Ka (the random number t) succeeds, the process proceeds to the subsequent processing. On the other hand, when the verification of the response Ka (the random number t) fails, the process of FIG. 6 ends. When the verification of the response Ka (the random number t) fails, the terminal device 50 may execute a predetermined error process.

The terminal authentication processing unit 54 generates the response Ka (the random number v) using the MAC key Ka of the terminal key storage unit 52 and the challenge (the random number v) received from the in-vehicle device 70 by means of the terminal communication unit 51. The terminal authentication processing unit 54 returns the response Ka (the random number v) and the encrypted authority information Kc (the authority information) to the in-vehicle device 70 of the car 10 that is the transmission source of the challenge (the random number v) by means of the terminal communication unit 51.

The vehicle communication unit 71 of the in-vehicle device 70 of the car 10 receives the response Ka (the random number v) and the encrypted authority information Kc (the authority information) from the terminal device 50. The vehicle authentication processing unit 74 verifies the response Ka (the random number v) received from the terminal device 50. In the verification of the response Ka (the random number v), the vehicle authentication processing unit 74 uses the challenge (the random number v) transmitted to and held in the terminal device 50 in the above-described step S14 and the MAC key Ka of the vehicle key storage unit 72. A method of verifying the response Ka (the random number v) is similar to a method in which the terminal authentication processing unit 54 verifies the response Ka (the random number t).

When the verification of the response Ka (the random number v) succeeds, the process proceeds to the subsequent processing. On the other hand, when the verification of the response Ka (the random number v) fails, the process of FIG. 6 ends. When the verification of the response Ka (the random number v) fails, the in-vehicle device 70 may execute a predetermined error process.

The vehicle encryption processing unit 75 decrypts the encrypted authority information Kc (the authority information) with the encryption key Kc (steps S13 and S14) of the vehicle key storage unit 72. The authority information is acquired by this decryption. The vehicle control unit 77 holds the authority information.

Also, the terminal recording unit 56 records a log with respect to authentication between the own terminal device 50 and the in-vehicle device 70 as needed. Also, the vehicle recording unit 76 records a log with respect to authentication between the in-vehicle device 70 and the terminal device 50 as needed.

Steps S16 and S17 are the same as those of example 1 of the maintenance method. Here, a maintenance command transmitted from the terminal device 50 to the in-vehicle device 70 of the car 10 is a maintenance command within a range of the authority to maintain the car 10 given to the worker of the terminal device 50. The authority to maintain the car 10 given to the worker of the terminal device 50 is authority indicated by the authority information acquired by decrypting the encrypted authority information Kc (the authority information) in the in-vehicle device 70 of the car 10 in the above-described step S15a. When the maintenance command received from the terminal device 50 is a maintenance command within the range of the authority of the authority information, the vehicle control unit 77 performs control so that the maintenance command is executed. Otherwise, the vehicle control unit 77 performs control so that the maintenance command is not executed.

Also, the vehicle recording unit 76 records a log with respect to the maintenance command and the maintenance response as needed. Also, the terminal recording unit 56 records a log with respect to an operation of the maintenance work by the worker, the maintenance command, and the maintenance response as needed.

According to the above-described example 2 of the maintenance method, effects similar to those of the above-described example 1 of the maintenance method can be obtained.

Furthermore, according to example 2 of the maintenance method, the authority information indicating the authority to maintain the car 10 given to the worker of the worker authentication information is encrypted with the encryption key Kc and securely supplied from the server device 30 to the in-vehicle device 70 of the car 10.

Thereby, although the maintenance command within the range of the authority given to the worker is executed by the car 10, it is possible to prevent the maintenance command outside the range of the authority given to the worker from being executed in the car 10.

Example 3 of Maintenance Method

Figure 7:
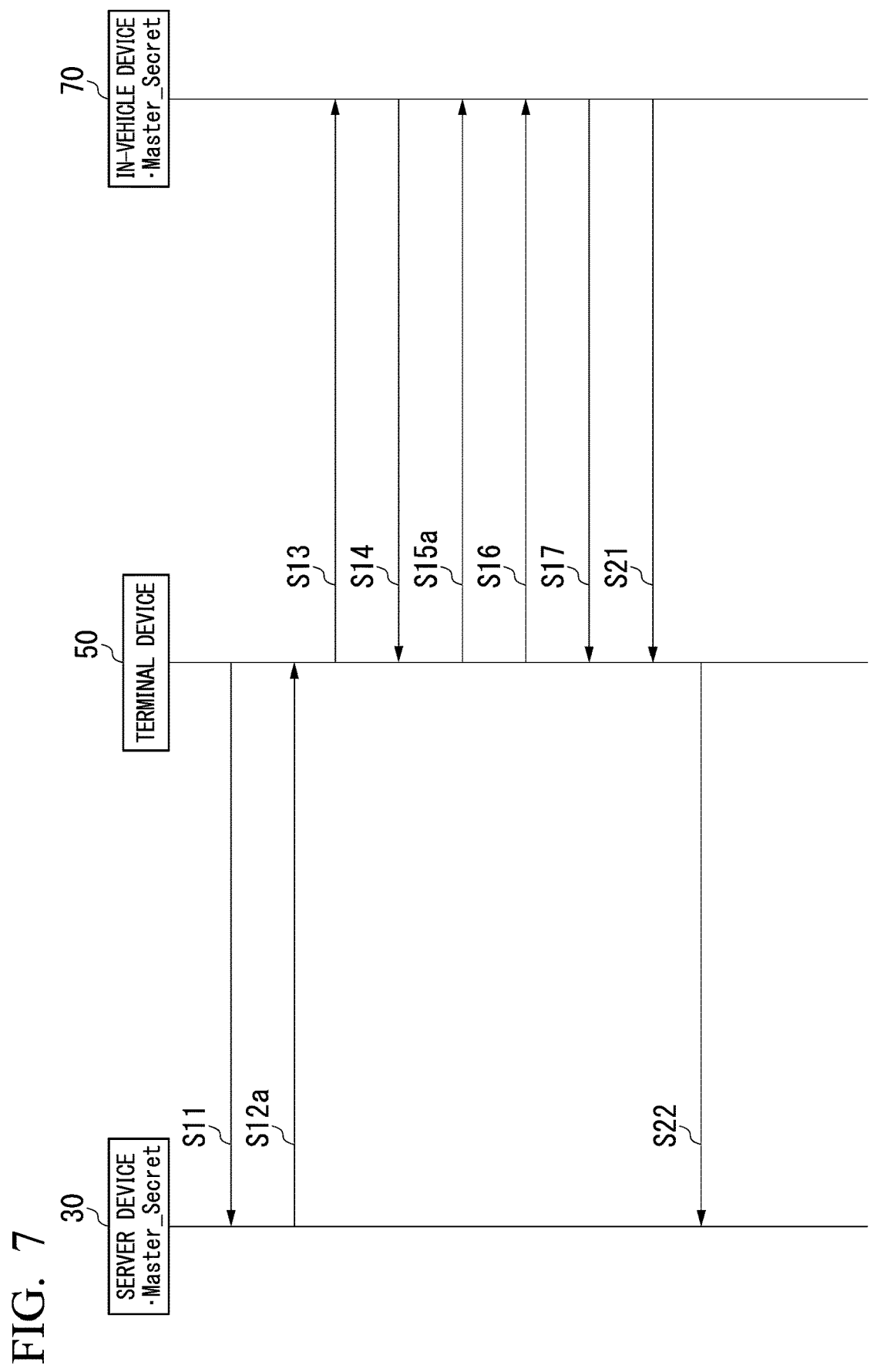
FIG. 7 is a sequence chart showing example 3 of the maintenance method according to an embodiment.

Example 3 of the maintenance method according to the present embodiment will be described with reference to FIG. 7. FIG. 7 is a sequence chart showing example 3 of the maintenance method according to the present embodiment. In FIG. 7, parts corresponding to the respective steps of FIG. 6 are denoted by the same reference signs. As in example 2 of the maintenance method, the server key storage unit 32 of the server device 30 and the vehicle key storage unit 72 of the in-vehicle device 70 pre-store the same master key Master_Secret. Hereinafter, differences from example 2 of the maintenance method will be mainly described.

Steps S11 to S17 are the same as those of example 2 of the maintenance method. The maintenance command transmission of the terminal device 50 in step S16 and the maintenance response return of the in-vehicle device 70 in step S17 may be iteratively executed. Also, the server key storage unit 32 stores the encryption key Kc.

(Step S21) The vehicle encryption processing unit 75 of the in-vehicle device 70 of the car 10 generates report data Kc (VIN, log) by encrypting the vehicle identification number VIN of own car 10 and the log of the vehicle recording unit 76 with the encryption key Kc of the vehicle key storage unit 72. The vehicle communication unit 71 transmits the report data Kc (VIN, log) to the terminal device 50.

Also, the following timing is exemplified as an example of a timing at which the report data Kc (VIN, log) is generated and transmitted from the car 10 to the terminal device 50. That is, when the vehicle control unit 77 determines the end of the maintenance work and the maintenance work ends, the vehicle control unit 77 may instruct the vehicle encryption processing unit 75 to generate the report data and instruct the vehicle communication unit 71 to transmit the report data. As another example of a timing at which the report data Kc (VIN, log) is generated and transmitted from the car 10 to the terminal device 50, the report data Kc (VIN, log) may be generated and transmitted to the terminal device 50 every time a set of the maintenance command transmission of the terminal device 50 and the maintenance response return of the in-vehicle device 70 is executed a predetermined number of times.

(Step S22) The terminal communication unit 51 of the terminal device 50 transmits the report data Kc (VIN, log) received from the car 10 to the server device 30. The server encryption processing unit 35 of the server device 30 decrypts the report data Kc (VIN, log) received from the terminal device 50 by the server communication unit 31 with the encryption key Kc of the server key storage unit 32. As a result of this decryption, the vehicle identification number VIN and the log of the car 10 of the vehicle identification number VIN are acquired. The server recording unit 36 stores the vehicle identification number VIN and the log of the car 10 of the vehicle identification number VIN acquired from the report data Kc (VIN, log) in association.

Also, even if the terminal device 50 receives the report data Kc (VIN, log) from the car 10, the following process is performed when a timing of transmission from the terminal device 50 to the server device 30 cannot be obtained immediately. That is, the terminal device 50 holds the report data Kc (VIN, log) and transmits the held report data Kc (VIN, log) to the server device 30 when the timing of the transmission to the server device 30 is obtained. For example, the terminal device 50 may transmit the report data Kc (VIN, log) held by the terminal device 50 to the server device 30 at the next timing of logging into the server device 30.

According to the above-described example 3 of the maintenance method, effects similar to those of the above-described examples 1 and 2 of the maintenance method can be obtained. Furthermore, according to example 3 of the maintenance method, the server device 30 can store a log related to the maintenance of the car 10.

Example 4 of Maintenance Method

Example 4 of the maintenance method according to the present embodiment will be described with reference to FIG. 8. FIG. 8 is a sequence chart showing example 4 of the maintenance method according to the present embodiment. In FIG. 8, parts corresponding to the respective steps of FIG. 7 are denoted by the same reference signs. As in example 3 of the maintenance method, the server key storage unit 32 of the server device 30 and the vehicle key storage unit 72 of the in-vehicle device 70 pre-store the same master key Master_Secret. Hereinafter, differences from example 3 of the maintenance method will be mainly described.

(Step S10a) The terminal communication unit 51 of the terminal device 50 and the server communication unit 31 of the server device 30 establish a virtual private network (VPN) circuit. Thereafter, the terminal communication unit 51 of the terminal device 50 and the server communication unit 31 of the server device 30 perform communication using the VPN circuit.

Steps S11 to S17 are the same as those of example 3 of the maintenance method. Also, the VPN circuit between the terminal communication unit 51 of the terminal device 50 and the server communication unit 31 of the server device 30 may be disconnected when step S12*a* ends.

(Step S10*b*) The terminal communication unit 51 of the terminal device 50 establishes the VPN circuit with the server communication unit 31 of the server device 30 when the maintenance work on the car 10 ends. Also, when the VPN circuit established in step S10*a* is maintained between the terminal communication unit 51 of the terminal device 50 and the server communication unit 31 of the server device 30, the VPN circuit may be continuously used.

Steps S21 and S22 are the same as those of example 3 of the maintenance method. Here, the report data Kc (VIN, log) is transmitted from the terminal device 50 to the server device 30 via the VPN circuit established between the terminal communication unit 51 of the terminal device 50 and the server communication unit 31 of the server device 30.

According to the above-described example 4 of the maintenance method described above, effects similar to those of the above-described examples 1 to 3 of the maintenance method can be obtained. Furthermore, according to example 4 of the maintenance method, communication is performed between the terminal device 50 and the server device 30 by the VPN circuit. Thus, it is possible to improve the security of data such as the MAC key Ka that is exchanged between the terminal device 50 and the server device 30.

Modified Example 1

Modified example 1 of the above-described examples 1 to 4 of the maintenance method described above will be described. In modified example 1, the server device 30 is provided with a number-of-issues limiting function of limiting the number of vehicles 10 to which the MAC key Ka is issued during the same period with respect to the same worker authentication information to a certain number.

A case in which the same worker transmits a large number of vehicle identification numbers VIN to the server device 30 during the same period by means of the terminal device 50 and acquires the MAC key Ka corresponding to a large number of vehicle identification numbers VIN is conceivable. In this case, although the same worker can perform maintenance work on a large number of vehicles 10 by means of the terminal device 50, it may not be preferable for the same worker to perform maintenance work on more vehicles 10 than are necessary. Thus, the server device 30 is provided with the number-of-issues limiting function.

An example of the number-of-issues limiting function of the server device 30 will be described. The server control unit 37 of the server device 30 records the number of vehicle identification numbers VIN of targets to which the MAC key Ka is issued during each certain period with respect to each piece of worker authentication information. On the basis of the record, the server control unit 37 determines whether or not the number of vehicles 10 (vehicle identification numbers VIN) to which the MAC key Ka has been issued during the same period with respect to one piece of worker authentication information has reached a predetermined issuance upper limit value (N which is an integer of 1 or more). As a result of the determination, the server control unit 37 performs control so that the new issuance of the MAC key Ka during the corresponding period is stopped with respect to the worker authentication information for which the number has reached the issuance upper limit value. The issuance upper limit value may be the same value or a different value for each piece of worker authentication information. Any issuance upper limit value may be stored in the worker information storage unit 40 with respect to each piece of worker authentication information.

Also, in terms of the encryption key Kc, as in the MAC key Ka, the number of vehicles 10 to which the encryption key Kc is issued during the same period with respect to the same worker authentication information may be limited to a certain number.

Modified Example 2

Modified example 2 of the above-described examples 1 to 4 of the maintenance method will be described. In modified example 2, the terminal device 50 is provided with an erasing function of erasing the MAC key Ka held by the terminal device 50 from the terminal device 50 when the maintenance work on the car 10 ends.

It may not be preferable that the terminal device 50 continuously hold the MAC key Ka even after the maintenance work on the car 10 ends in consideration of the possibility of unauthorized access to the terminal device 50 or the like. Thus, the terminal device 50 is provided with the erasing function.

An example of the erasing function of the terminal device 50 will be described. The terminal key storage unit 52 of the terminal device 50 stores the MAC key Ka received from the server device 30. The terminal control unit 57 causes the MAC key Ka to be erased from the terminal key storage unit 52 according to a maintenance work end signal.

The maintenance work end signal is a signal indicating the end of the maintenance work on the car 10. The maintenance work end signal may be, for example, a signal indicating that the worker has performed an operation indicating the end of the maintenance work by means of the terminal device 50. The maintenance work end signal may be, for example, a signal indicating that the terminal device 50 has ended the execution of a maintenance application of the car 10. The maintenance work end signal may be, for example, a signal indicating that the activation of the terminal device 50 is ended.

Also, when the terminal device 50 holds the encrypted authority information Kc (the authority information) received from the server device 30, the terminal control unit 57 may erase the encrypted authority information Kc (the authority information) according to the maintenance work end signal.

Also, the terminal control unit 57 may erase the MAC key Ka and the encrypted authority information Kc (the authority information) when the authentication process according to the challenge and the response between the terminal device 50 and the in-vehicle device 70 of the car 10 has been completed. Alternatively, the terminal control unit 57 may erase the MAC key Ka and the encrypted authority information Kc (the authority information) at the next timing of logging into the server device 30.

Example 5 of Maintenance Method

Example 5 of the maintenance method according to the present embodiment will be described with reference to FIG. 9. FIG. 9 is a sequence chart showing example 5 of the maintenance method according to the present embodiment.

The server device 30 pre-stores a server public key certificate Kp and a server secret key Ks in the server key storage unit 32. The terminal device 50 pre-stores the server public key certificate Kp in the terminal key storage unit 52. The in-vehicle device 70 pre-stores the server public key certificate Kp in the vehicle key storage unit 72.

(Step S10a) The terminal communication unit 51 of the terminal device 50 and the server communication unit 31 of the server device 30 establish a VPN circuit. Thereafter, the terminal communication unit 51 of the terminal device 50 and the server communication unit 31 of the server device 30 perform communication using the VPN circuit.

Step S11 is the same as that of example 1 of the maintenance method. When the authentication for the login request message succeeds, step S10c is executed.

(Step S10c) The server communication unit 31 of the server device 30 establishes the VPN circuit with the vehicle communication unit 71 of the in-vehicle device 70 of the car 10 corresponding to the vehicle identification number VIN of the login request message whose authentication has succeeded via the terminal device 50. In the VPN circuit between the server communication unit 31 and the vehicle communication unit 71, the terminal communication unit 51 of the terminal device 50 relays communication data. Thereafter, the server communication unit 31 of the server device 30 and the vehicle communication unit 71 of the in-vehicle device 70 of the car 10 perform communication using the VPN circuit.

(Step S30) The vehicle control unit 77 of the in-vehicle device 70 of the car 10 issues a token. The vehicle control unit 77 transmits the vehicle identification number VIN of the car 10 and the issued token to the server device 30 by means of the vehicle communication unit 71. The server communication unit 31 of the server device 30 receives the vehicle identification number VIN and the token from the car 10.

(Step S31) The server communication unit 31 of the server device 30 transmits a login request response message to the terminal device 50 that is the transmission source of the login request message whose authentication has succeeded. The login request response message includes the login result "success (OK)" and the token received from the car 10. Furthermore, the login request response message may include an electronic signature of the token. The server device 30 generates the electronic signature of the token using the server secret key Ks of the server key storage unit 32.

The terminal communication unit 51 of the terminal device 50 receives the login request response message from the server device 30. The terminal control unit 57 holds the token of the login request response message.

Also, when the login request response message includes the electronic signature of the token, the terminal device 50 verifies the electronic signature of the token using the server public key certificate Kp of the terminal key storage unit 52. When the verification of the electronic signature of the token succeeds, the terminal control unit 57 holds the token. On the other hand, when the verification of the electronic signature of the token fails, the terminal control unit 57 discards the token. When the verification of the electronic signature of the token fails, the terminal control unit 57 requests the server device 30 to retransmit the token.

(Step S32) The terminal control unit 57 of the terminal device 50 transmits a maintenance command transmission request message for requesting transmission of a maintenance command to be executed in the car 10 to the server device 30 by means of the terminal communication unit 51. The maintenance command transmission request message includes a token held by the terminal control unit 57. The maintenance command in which the terminal control unit 57 requests the server device 30 to transmit by the maintenance command transmission request message may be a maintenance command specified by the worker using the terminal device 50 or may be preset as maintenance work details.

Also, the server device 30 may have a web page provision function and perform control for causing a web page having a maintenance command selection menu to be displayed on a display screen of the terminal device 50. The worker selects a desired maintenance command from the maintenance command selection menu of the web page displayed on the display screen of the terminal device 50. Thereby, the terminal control unit 57 transmits a maintenance command transmission request message for requesting transmission of the selected maintenance command to the server device 30 by means of the terminal communication unit 51. The maintenance command transmission request message includes the token held by the terminal control unit 57.

The server communication unit 31 of the server device 30 receives the maintenance command transmission request message from the terminal device 50.

(Step S33) The server control unit 37 of the server device 30 transmits the maintenance command of the maintenance request target indicated by the maintenance command transmission request message received from the terminal device 50 by the server communication unit 31 and the token of the maintenance command transmission request message to the in-vehicle device 70 of the car 10 by means of the server communication unit 31. The vehicle communication unit 71 of the in-vehicle device 70 of the car 10 receives the maintenance command and the token from the server device 30.

Also, the server device 30 may transmit the maintenance command, the token, and the electronic signature of the maintenance command and the token to the in-vehicle device 70 of the car 10 by means of the server communication unit 31.

The server device 30 generates the electronic signature of the maintenance command and the token using the server secret key Ks of the server key storage unit 32. The in-vehicle device 70 verifies the electronic signature of the maintenance command and the token received from the server device 30 using the server public key certificate Kp of the vehicle key storage unit 72. When the verification of the electronic signature of the maintenance command and the token succeeds, the in-vehicle device 70 holds the maintenance command and the token. On the other hand, when the verification of the electronic signature of the maintenance command and the token fails, the in-vehicle device 70 discards the maintenance command and the token. When the verification of the electronic signature of the maintenance command and the token fails, the in-vehicle device 70 requests the server device 30 to retransmit the maintenance command and the token.

(Step S34) The vehicle control unit 77 of the in-vehicle device 70 of the car 10 verifies whether or not the token received from the server device 30 by the vehicle communication unit 71 is its own issued token. When a token verification result indicates the success, the process proceeds to the subsequent processing. On the other hand, when the token verification result indicates the failure, the process of FIG. 9 ends. When the token verification result indicates the failure, the in-vehicle device 70 may execute a predetermined error process.

The vehicle control unit 77 transfers the maintenance command for which the token verification result indicates the success to the in-vehicle device of the car 10 that executes the maintenance command. Examples of the in-vehicle device of the car 10 that executes the maintenance command include the gateway device 16 and the ECU 18.

Also, the in-vehicle device 70 itself receiving the maintenance command from the terminal device 50 may execute the maintenance command.

The vehicle control unit 77 receives a result of executing the maintenance command from the in-vehicle device that is a transmission destination of the maintenance command. The vehicle control unit 77 returns the maintenance response including the result of executing the maintenance command and the token of the maintenance command to the server device 30 by means of the vehicle communication unit 71.

(Step S35) The server control unit 37 of the server device 30 generates browsing data of the result of executing the maintenance command on the basis of the maintenance response received from the car 10 by the server communication unit 31. The server control unit 37 transmits the browsing data of the result of executing the maintenance command and the token received by the server communication unit 31 from the car 10 together with the maintenance response to the terminal device 50 through the server communication unit 31.

The terminal device 50 receives the browsing data of the result of executing the maintenance command and the token from the server device 30 by means of the terminal communication unit 51. The terminal control unit 57 verifies whether or not the received token is a token held by itself. When the token verification result indicates the success, the process proceeds to the subsequent processing. On the other hand, when the token verification result indicates the failure, the process of FIG. 9 ends. When the token verification result indicates the failure, the terminal device 50 may execute a predetermined error process.

The terminal control unit 57 causes the browsing data of the result of executing the maintenance command for which the token verification result indicates the success to be displayed on the display screen of the terminal device 50. Thereby, the worker can check the result of executing the maintenance command on the display screen.

According to the above-described example 5 of the maintenance method, the server device 30 authenticates the worker authentication information received from the terminal device 50 and transmits the token issued by the in-vehicle device 70 of the car 10 to the terminal device 50 whose worker authentication information has been successfully authenticated. The terminal device 50 transmits the maintenance command to the car 10 by means of the server device 30 using the token received from the server device 30. The in-vehicle device 70 of the car 10 verifies the token used to transmit the maintenance command. Thereby, the in-vehicle device 70 of the car 10 that is a maintenance work target can authenticate that the terminal device 50 is operated by an authorized person for which the server device 30 has performed identity verification on the basis of authentication of the worker authentication information. This enables security to be improved when the maintenance work on the car 10 is performed.

As described above, according to the present embodiment, it is possible to authenticate whether the worker who operates the terminal device 50 used for the maintenance work on the car 10 is an authorized person. Thereby, it is possible to improve the security when maintenance work on a vehicle such as a car is performed.

According to the present embodiment, a period during which the MAC key Ka and the encryption key Kc held by the terminal device 50 can be used can be limited by the period information. Thereby, it is possible to prevent the terminal device 50 from being used inappropriately.

According to the present embodiment, it is possible to determine which worker has performed what type of maintenance work on which car 10 on the basis of various types of logs stored by the server device 30.

Thereby, an unauthorized worker can be prevented from performing the maintenance work on the car 10 by making a setting in the server device 30 so that the MAC key Ka is not issued to the unauthorized worker.

According to the present embodiment, only maintenance commands within a range of the authority to maintain the car 10 given to each worker can be executed in the car 10. Thereby, for example, the work of security items especially related to the security of the car 10 can be prevented from being performed by the worker who does not have the authority to perform the work of security items.

Although embodiments of the present invention have been described above with reference to the drawings, specific configurations are not limited to the embodiments, and design changes and the like may also be included without departing from the scope of the present invention.

Although the in-vehicle device 70 of the car 10 transfers the maintenance command to the in-vehicle device such as the ECU 18 of the car 10 that executes the maintenance command in the above-described embodiment, the present invention is not limited thereto. For example, the in-vehicle device that executes a maintenance command of the ECU 18 or the like of the car 10 may receive the maintenance command from the terminal device 50 to execute the maintenance command. In this case, the in-vehicle device 70 may be configured to issue a token to the in-vehicle device that executes the maintenance command of the terminal device 50, the ECU 18, or the like and control the authorized execution of the maintenance command using the token.

Also, the worker authentication method may be an ID/password authentication method or may be a biometric authentication method using biometric information such as a fingerprint of the worker.

For example, the above-described embodiment may be applied to the car 10 in a car manufacturing plant, a maintenance plant, a shop, a storage place, and the like.

Although a car is an exemplary example of a vehicle in the embodiment described above, the present invention is also applicable to other vehicles other than a car such as a bicycle with a prime mover or a railway vehicle.

Also, processes may be performed by recording a computer program for implementing functions of each device described above on a computer-readable recording medium and causing a computer system to read and execute the program recorded on the recording medium. Also, the "computer system" described here may include an operating system (OS) and hardware such as peripheral devices.

Also, the "computer-readable recording medium" refers to a storage device including a flexible disk, a magneto-optical disc, a read only memory (ROM), a writable non-volatile memory such as a flash memory, a portable medium such as a digital versatile disc (DVD), and a hard disk embedded in the computer system.

Furthermore, the "computer-readable recording medium" is assumed to include a medium that holds a program for a fixed period of time, such as a volatile memory (for example, a dynamic random access memory (DRAM)) inside a computer system serving as a server or a client when the program is transmitted via a network such as the Internet or a communication circuit such as a telephone circuit.

Also, the above-described program may be transmitted from a computer system storing the program in a storage device or the like via a transmission medium or transmitted to another computer system by transmission waves in a transmission medium. Here, the "transmission medium" for transmitting the program refers to a medium having a function of transmitting information, such as a network (a communication network) like the Internet or a communication circuit (a communication line) like a telephone circuit.

Also, the above-described program may be a program for implementing some of the above-described functions.

Further, the above-described program may be a program capable of implementing the above-described functions in combination with a program already recorded on the computer system, i.e., a so-called differential file (differential program).

INDUSTRIAL APPLICABILITY

According to the present invention, it is possible to improve security when maintenance work on a vehicle such as a car is performed.

REFERENCE SIGNS LIST

1 Maintenance system
16 Gateway device
17 In-vehicle network
18 ECU
30 Server device
31 Server communication unit
32 Server key storage unit
33 Server key generation unit
34 Server authentication processing unit
35 Server encryption processing unit
36 Server recording unit
37 Server control unit
40 Worker information storage unit
50 Terminal device
51 Terminal communication unit
52 Terminal key storage unit
54 Terminal authentication processing unit
56 Terminal recording unit
57 Terminal control unit
70 In-vehicle device
71 Vehicle communication unit
72 Vehicle key storage unit
73 Vehicle key generation unit
74 Vehicle authentication processing unit
75 Vehicle encryption processing unit
76 Vehicle recording unit
77 Vehicle control unit

The invention claimed is:

1. A maintenance system comprising:
a server device;
a terminal device; and
an in-vehicle device installed in a vehicle,
wherein the server device includes:
at least one first memory configured to store instructions; and
at least one first processor configured to execute the instructions to:
receive worker authentication information from the terminal device;
perform an authentication process on the worker authentication information; and
transmit a first key to be used with the in-vehicle device to the terminal device whose worker authentication information has been successfully authenticated,
wherein the terminal device includes:
at least one second memory configured to store instructions; and
at least one second processor configured to execute the instructions to:
transmit the worker authentication information to the server device;
receive the first key from the server device; and
perform an authentication process with the in-vehicle device using the first key, and
wherein the in-vehicle device includes:
at least one third memory configured to store instructions; and
at least one third processor configured to execute the instructions to perform an authentication process with the terminal device using the first key,
wherein
the at least one first memory is configured to store a master key,
the at least one first processor is configured to execute the instructions to generate the first key using the master key and a vehicle correspondence identifier associated with the worker authentication information,
the at least one third memory is configured to store the same master key as the master key of the server device, and
the at least one third processor is configured to execute the instructions to generate the first key using the master key of the at least one third memory and the vehicle correspondence identifier corresponding to the vehicle,
wherein
the at least one first processor is configured to execute the instructions to generate a second key using the master key of the at least one first memory and the vehicle correspondence identifier associated with the worker authentication information,
the at least one third processor is configured to execute the instructions to generate the second key using the master key of the at least one third memory and the vehicle correspondence identifier corresponding to the vehicle, and
the at least one first processor is configured to execute the instructions to:
encrypt authority information indicating authority to maintain the vehicle, assigned to a worker of the worker authentication information using the generated second key; and
transmit the encrypted authority information in which the authority information is encrypted to the vehicle via the terminal device, and
wherein the at least one third processor is configured to execute the instructions to decrypt the encrypted authority information using the generated second key.

2. The maintenance system according to claim 1,
wherein the at least one first processor is further configured to execute the instructions to generate the first key using first period information indicating a predetermined period based on an authentication time of the worker authentication information, and
wherein the at least one third processor is further configured to execute the instructions to generate the first key using second period information indicating a predetermined period based on the time when the in-vehicle device has received an authentication request message from the terminal device.

3. The maintenance system according to claim 2,
wherein the at least one first processor is configured to execute the instructions to generate a second key using the master key of the at least one first memory and the vehicle correspondence identifier associated with the worker authentication information,
wherein the at least one third processor is configured to execute the instructions to generate the second key using the master key of the at least one third memory and the vehicle correspondence identifier corresponding to the vehicle,
wherein the at least one first processor is configured to execute the instructions to:
   encrypt authority information indicating authority to maintain the vehicle, assigned to a worker of the worker authentication information using the generated second key; and
   transmit the encrypted authority information in which the authority information is encrypted to the vehicle via the terminal device, and
wherein the at least one third processor is configured to execute the instructions to decrypt the encrypted authority information using the generated second key.

4. The maintenance system according to claim 1, wherein
the at least one third processor is configured to execute the instructions to record a log of the in-vehicle device,
the at least one second processor is configured to execute the instructions to receive the log from the vehicle and transmit the received log to the server device, and
the at least one first memory is configured to store the log received from the terminal device.

5. The maintenance system according to claim 1,
wherein the at least one first processor is configured to execute the instructions to limit the number of vehicles to which the first key is issued during the same period with respect to the same worker authentication information to a certain number.

6. The maintenance system according to claim 1, wherein
the at least one second memory is configured to store the first key received from the server device, and
the at least one second processor is configured to execute the instructions to cause the first key to be erased from the at least one second memory by a signal indicating an end of maintenance work on the vehicle.

7. A maintenance system comprising:
a server device;
a terminal device; and
an in-vehicle device installed in a vehicle,
wherein the server device includes:
   at least one first memory configured to store instructions; and
   at least one first processor configured to execute the instructions to:
      control the server device;
      receive worker authentication information from the terminal device;
      perform an authentication process on the worker authentication information; and
      transmit a token issued by the in-vehicle device to the terminal device whose worker authentication information has been successfully authenticated,
wherein the terminal device includes:
   at least one second memory configured to store instructions; and
   at least one second processor configured to execute the instructions to:
      transmit the worker authentication information to the server device;
      receive the token from the server device; and
      transmit a transmission request including the token and a maintenance command for the vehicle to the server device, and
wherein the in-vehicle device includes:
   at least one third memory configured to store instructions; and
   at least one third processor configured to execute the instructions to issue the token,
wherein
   the at least one first processor is configured to execute the instructions to transmit the token and the maintenance command included in the transmission request to the in-vehicle device in response to the reception of the transmission request transmitted from the terminal device whose worker authentication information has been successfully authenticated, and
   the at least one third processor is configured to execute the instructions to verify the issued token and the token received from the server device, and cause the maintenance command to be executed, received with the token from the server device, when verification succeeds.

8. A maintenance method for use in a maintenance system including a server device, a terminal device, and an in-vehicle device installed in a vehicle, the maintenance method comprising:
transmitting, by the terminal device, worker authentication information to the server device;
receiving, by the server device, the worker authentication information from the terminal device;
performing, by the server device, an authentication process on the worker authentication information;
transmitting, by the server device, a first key used with the in-vehicle device to the terminal device whose worker authentication information has been successfully authenticated by the authentication process;
receiving, by the terminal device, the first key from the server device;
performing, by the terminal device, an authentication process with the in-vehicle device using the first key; and
performing, by the in-vehicle device, an authentication process with the terminal device using the first key,
wherein the maintenance method further comprises:
storing, by the server device, a master key;
generating, by the server device, the first key using the master key and a vehicle correspondence identifier associated with the worker authentication information;
storing, by the in-vehicle device, the same master key as the master key of the server device;
generating, by the in-vehicle device, the first key using the stored master key and the vehicle correspondence identifier corresponding to the vehicle;
generating, by the server device, a second key using the stored master key and the vehicle correspondence identifier associated with the worker authentication information;
generating, by the in-vehicle device, the second key using the stored master key and the vehicle correspondence identifier corresponding to the vehicle;
encrypting, by the server device, authority information indicating authority to maintain the vehicle, assigned to a worker of the worker authentication information using the generated second key;

transmitting, by the server device, the encrypted authority information in which the authority information is encrypted to the vehicle via the terminal device; and decrypting, by the in-vehicle device, the encrypted authority information using the generated second key.

9. A maintenance method for use in a maintenance system including a server device, a terminal device, and an in-vehicle device installed in a vehicle, the maintenance method comprising:

transmitting, by the terminal device, worker authentication information to the server device;

receiving, by the server device, the worker authentication information from the terminal device;

performing, by the server device, an authentication process on the worker authentication information;

issuing, by the in-vehicle device, a token;

transmitting, by the server device, the token issued by the in-vehicle device to the terminal device whose worker authentication information has been successfully authenticated by the authentication process;

receiving, by the terminal device, the token from the server device; and transmitting, by the terminal device, a transmission request including the token and a maintenance command for the vehicle to the server device, wherein the maintenance method further comprises:

transmitting, by the server device, the token and the maintenance command included in the transmission request to the in-vehicle device in response to the reception of the transmission request transmitted from the terminal device whose worker authentication information has been successfully authenticated; and verifying, by the in-vehicle device, the issued token and the token received from the server device, and causing the maintenance command to be executed, received with the token from the server device, when verification succeeds.

\* \* \* \* \*